US012085877B2

(12) United States Patent
Shoji et al.

(10) Patent No.: US 12,085,877 B2
(45) Date of Patent: Sep. 10, 2024

(54) CONVEYANCE DEVICE AND IMAGE FORMING APPARATUS

(71) Applicants: Keitaro Shoji, Kanagawa (JP); Yasunori Ishigaya, Kanagawa (JP); Daisuke Hirano, Kanagawa (JP)

(72) Inventors: Keitaro Shoji, Kanagawa (JP); Yasunori Ishigaya, Kanagawa (JP); Daisuke Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/168,302

(22) Filed: Feb. 13, 2023

(65) Prior Publication Data

US 2023/0266699 A1 Aug. 24, 2023

(30) Foreign Application Priority Data

Feb. 22, 2022 (JP) ................................ 2022-025474

(51) Int. Cl.
*G03G 15/20* (2006.01)
*H05B 1/02* (2006.01)

(52) U.S. Cl.
CPC ....... *G03G 15/2039* (2013.01); *H05B 1/0241* (2013.01)

(58) Field of Classification Search
CPC .......................... G03G 15/2039; H05B 1/0241
See application file for complete search history.

(56) References Cited

U.S. PATENT DOCUMENTS

2010/0080599 A1* 4/2010 Ito ...................... G03G 15/2042 399/68
2021/0278790 A1 9/2021 Furuichi et al.
(Continued)

FOREIGN PATENT DOCUMENTS

JP 2010-026449 2/2010
JP 2012-198475 10/2012
JP 2020-052345 4/2020

OTHER PUBLICATIONS

U.S. Appl. No. 18/061,125 filed Dec. 2, 2022, Haruo Shida, et al.
(Continued)

*Primary Examiner* — Stephanie E Bloss
*Assistant Examiner* — Michael A Harrison
(74) *Attorney, Agent, or Firm* — Harness, Dickey & Pierce, P.L.C.

(57) ABSTRACT

A conveyance device to convey a recording medium includes a heater, a first temperature detector, a second temperature detector, and a recording medium detector. The heater heats the recording medium. The first temperature detector and the second temperature detector detect a temperature of the heater. The recording medium detector detects the recording medium. The first temperature detector is disposed at a position farther from a center position of a heating region of the heater than the second temperature detector in a conveyance orthogonal direction. The conveyance orthogonal direction is along a surface of the recording medium and orthogonal to a direction in which the recording medium is conveyed. The recording medium detector is disposed on a side opposite to the first temperature detector with respect to the second temperature detector in the conveyance orthogonal direction.

10 Claims, 15 Drawing Sheets

(56) References Cited

U.S. PATENT DOCUMENTS

| | | | |
|---|---|---|---|
| 2022/0043376 | A1 | 2/2022 | Shoji et al. |
| 2023/0004108 | A1 | 1/2023 | Furuichi et al. |
| 2023/0010218 | A1 | 1/2023 | Shoji et al. |

OTHER PUBLICATIONS

U.S. Appl. No. 18/060,566, filed Oct. 11, 2022, Yuusuke Furuichi, et al.

U.S. Appl. No. 17/963,195, filed Oct. 11, 2022, Yasunori Ishigaya, et al.

* cited by examiner

CONVEYANCE DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-025474, filed on Feb. 22, 2022, in the Japan Patent Office, the entire disclosure of which is hereby incorporated by reference herein.

BACKGROUND

Technical Field

Embodiments of the present disclosure relate to a conveyance device and an image forming apparatus.

Related Art

In an image forming apparatus including a conveyance device, a user may set a recording medium of a different size in a sheet feeding tray by mistake so that an image forming operation may be performed on the wrong recording medium.

In such a case, overheating of a rotator (fixing belt) may occur. That is, if the fixing operation is performed on a recording medium of a size smaller than an original size, a region of the rotator (fixing belt) from which heat is not removed by the recording medium becomes large, the temperature of this area of the rotator (fixing belt) excessively rises, and eventually, the rotator (fixing belt) may be damaged. Furthermore, if a recording medium of a different sizes is arranged, the recording media may be displaced in a conveyance orthogonal direction, which is a direction perpendicular to a conveyance direction, and it is necessary to detect the temperature rise at the end portion on either side in the conveyance orthogonal direction.

For example, in an image heating device, a temperature detecting element is disposed on either end side in a width direction of a recording medium and a sheet passage detecting unit is disposed on either end side.

SUMMARY

According to an embodiment of the present disclosure, a conveyance device to convey a recording medium includes a heater, a first temperature detector, a second temperature detector, and a recording medium detector. The heater heats the recording medium. The first temperature detector and the second temperature detector detect a temperature of the heater. The recording medium detector detects the recording medium. The first temperature detector is disposed at a position farther from a center position of a heating region of the heater than the second temperature detector in a conveyance orthogonal direction. The conveyance orthogonal direction is along a surface of the recording medium and orthogonal to a direction in which the recording medium is conveyed. The recording medium detector is disposed on a side opposite to the first temperature detector with respect to the second temperature detector in the conveyance orthogonal direction.

According to another embodiment of the present disclosure, an image forming apparatus includes the conveyance device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
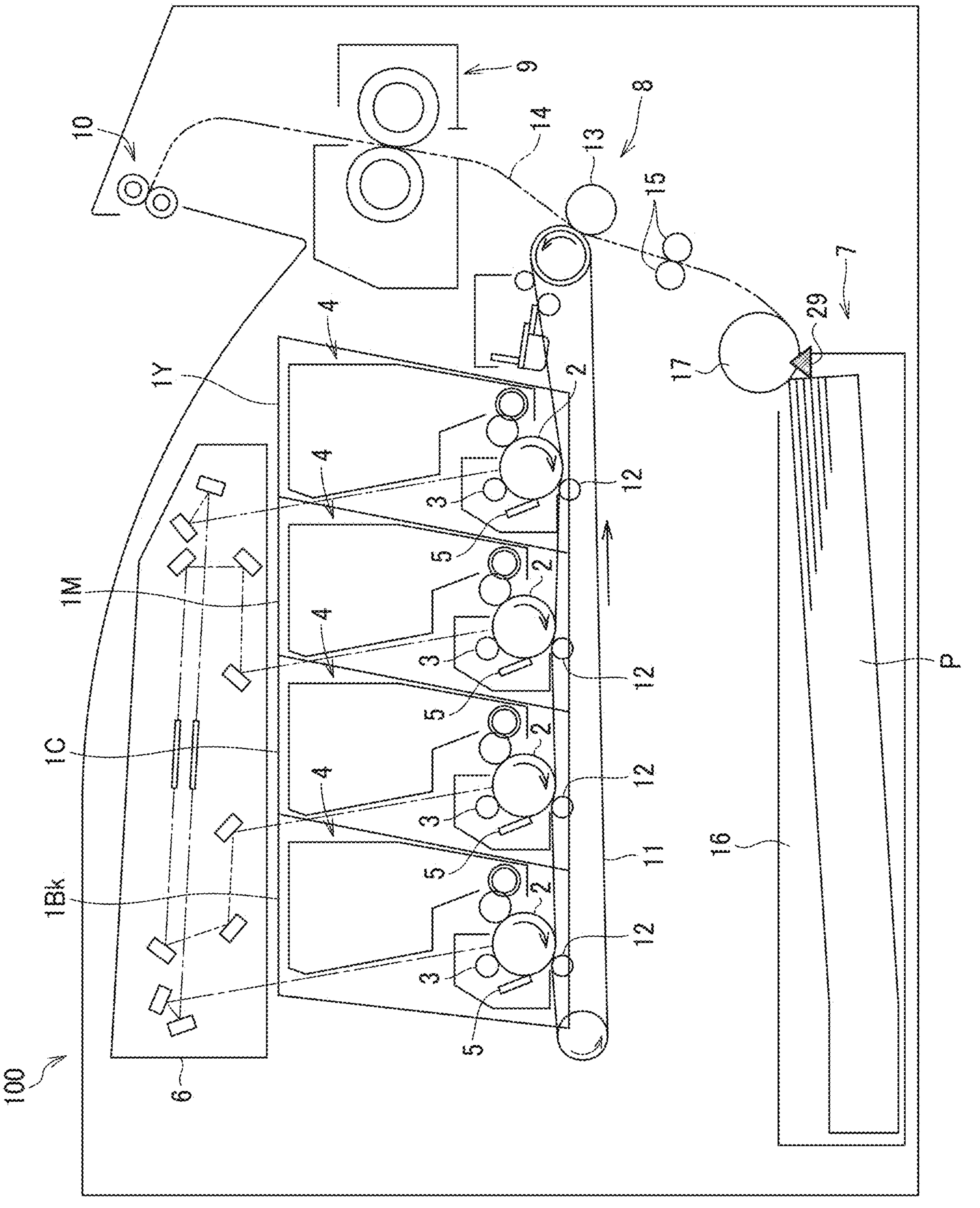
FIG. 1 is a schematic configuration diagram of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure will be described below. Identical reference numerals are assigned to identical components or equivalents and a description of those components is simplified or omitted. As used herein, the singular forms “a,” “an,” and “the” are intended to include the plural forms as well, unless the context clearly indicates otherwise.

FIG. 1 is a schematic cross-sectional view of an image forming apparatus according to an embodiment of the present disclosure.

An image forming apparatus 100 illustrated in FIG. 1 includes four image forming units 1Y, 1M, 1C, and 1Bk detachably attached to an image forming apparatus body. The image forming units 1Y, 1M, 1C, and 1Bk have substantially the same configuration except for containing different color developers, i.e., yellow (Y), magenta (M), cyan (C), and black (Bk) toners, respectively. The colors of the developers correspond to color separation components of full-color images. Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies toner as the developer to the surface of the photoconductor 2 to form a toner image. The cleaning device 5 cleans the surface of the photoconductor 2.

The image forming apparatus 100 also includes an exposure device 6, a sheet feeding device 7 as a recording medium feeder, a transfer device 8, a fixing device 9 as a heating device, and a sheet ejection device 10. The exposure device 6 exposes the surface of each photoconductor 2 to form an electrostatic latent image on the surface of the photoconductor 2. The sheet feeding device 7 includes a sheet feeding tray 16, a sheet feeding roller 17, and a sheet passage detection sensor 29. The sheet feeding device 7 supplies a sheet P as a recording medium to a sheet conveyance path 14 as a conveyance path of the recording medium. The transfer device 8 transfers toner images formed on the photoconductors 2 onto the sheet P. The fixing device 9 fixes the toner images transferred onto the sheet P to the surface of the sheet P. The sheet ejection device 10 ejects the sheet P outside the image forming apparatus 100. The image forming units 1Y, 1M, 1C, and 1Bk, the photoconductors 2, the charging devices 3, the exposure device 6, the transfer device 8, and the like constitute an image forming device that forms the toner image on the sheet P.

The transfer device 8 includes an intermediate transfer belt 11 having an endless form and serving as an intermediate transferor, four primary transfer rollers 12 serving as primary transferors, and a secondary transfer roller 13 serving as a secondary transferor. The intermediate transfer belt 11 is stretched by a plurality of rollers. Each of the four primary transfer rollers 12 transfers the toner image on each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip between the intermediate transfer belt 11 and each of the photoconductors 2. The secondary transfer roller 13 contacts, via the intermediate transfer belt 11, one of the plurality of rollers around which the intermediate transfer belt 11 is stretched. Thus, the secondary transfer nip is formed between the secondary transfer roller 13 and the intermediate transfer belt 11.

A timing roller pair 15 is arranged between the sheet feeding device 7 and the secondary transfer nip defined by the secondary transfer roller 13 in the sheet conveyance path 14. A roller pair disposed on the sheet conveyance path 14 such as the timing roller pair 15 is a conveyance member for conveying the sheet P on the sheet conveyance path 14.

Referring to FIG. 1, a description is provided of printing processes performed by the image forming apparatus 100 described above.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. Next, the exposure device 6 exposes the surface of each photoconductor 2 based on image data of the document read by the document reading device or print data instructed to be printed from the terminal. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming a toner image thereon.

The toner image formed on each of the photoconductors 2 reaches the primary transfer nip defined by each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. Thereafter, the full color toner image formed on the intermediate transfer belt 11 is conveyed to the secondary transfer nip defined by the secondary transfer roller 13 in accordance with rotation of the intermediate transfer belt 11. The full color toner image is transferred onto the sheet P conveyed to the secondary transfer nip. The sheet P is supplied from the sheet feeding tray 16. The timing roller pair 15 temporarily halts the sheet P supplied from the sheet feeding device 7. Thereafter, the timing roller pair 15 conveys the sheet P to the secondary transfer nip at a time when the full color toner image formed on the intermediate transfer belt 11 reaches the secondary transfer nip. Accordingly, the full color toner image is transferred onto and borne on the sheet P. After the toner image is transferred from each of the photoconductors 2 onto the intermediate transfer belt 11, each of cleaning devices 5 removes residual toner on each of the photoconductors 2.

The sheet P transferred with the full color toner image is conveyed to the fixing device 9 that fixes the full color toner image on the sheet P. Thereafter, the sheet ejection device 10 ejects the sheet P onto the outside of the image forming apparatus 100, thus finishing a series of printing processes.

Next, a configuration of the fixing device 9 is described.

Figure 2:
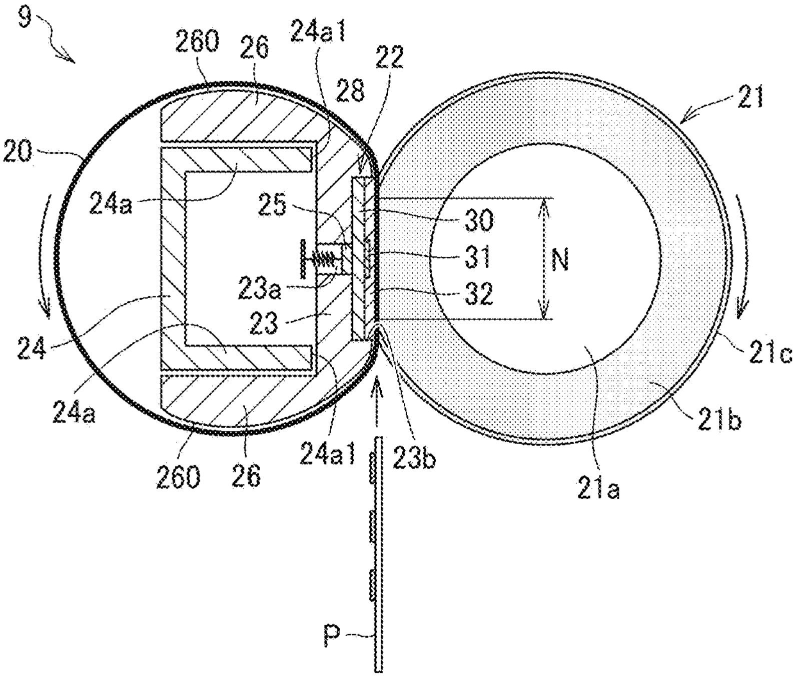
FIG. 2 is a schematic side cross-sectional view of a fixing device according to an embodiment of the present disclosure.

As illustrated in FIG. 2, the fixing device 9 according to the present embodiment includes a fixing belt 20, a pressure roller 21 as a counter rotator or a pressure member, a heater 22 as a heating body, a heater holder 23 as a holding member, a stay 24 as a supporting member, and a thermistor 25 as a temperature detector. The fixing belt 20 is an endless belt. The pressure roller 21 is in contact with the outer circumferential surface of the fixing belt 20 to form a fixing nip N between the pressure roller 21 and the fixing belt 20. The heater 22 heats the fixing belt 20. The heater holder 23 holds the heater 22. The stay 24 supports the heater holder 23. The thermistor 25 abuts on the back surface of the base 30 and detects the temperature of the base 30. The fixing member disposed in the fixing device is one mode of the rotator disposed in the heating device. The fixing device 9 in the present embodiment includes the fixing belt 20 as an example of the fixing member.

A direction orthogonal to the sheet of FIG. 2 is a longitudinal direction of the fixing belt 20, the pressure roller 21, the heater 22, the heater holder 23, the stay 24, and the like. Hereinafter, this direction will also be simply referred to as longitudinal direction. The longitudinal direction is also the width direction of the fixing belt 20 or the axial direction of the pressure roller 21, and is also the width direction of the conveyed sheet.

The fixing belt 20 includes a base layer configured by, for example, a tubular base made of polyimide (PI), and the tubular base has an outer diameter of 25 mm and a thickness of from 40 to 120 μm. The fixing belt 20 further includes a release layer serving as an outermost surface layer. The release layer is made of fluororesin, such as tetrafluoroethylene-perfluoroalkylvinylether copolymer (PFA) or polytetrafluoroethylene (PTFE) and has a thickness in a range of from 5 to 50 μm to enhance durability of the fixing belt 20 and facilitate separation of the sheet P. An elastic layer made of rubber having a thickness of from 50 to 500 μm may be interposed between the base layer and the release layer. The fixing belt 20 of the present embodiment may be a rubberless belt including no elastic layer. The base layer of the fixing belt 20 may be made of heat resistant resin such as polyetheretherketone (PEEK) or metal such as nickel (Ni) and steel use stainless (SUS), instead of polyimide. The inner circumferential surface of the fixing belt 20 may be coated with polyimide or PTFE as a slide layer.

The pressure roller 21 having, for example, an outer diameter of 25 mm, includes a solid iron core **21*a*, an elastic layer 21*b* formed on the surface of the core 21*a*, and a release layer 21*c* formed on the outside of the elastic layer 21*b*. The elastic layer 21*b* is made of silicone rubber and has a thickness of 3.5 mm, for example. Preferably, the release layer 21*c* is formed by a fluororesin layer having, for example, a thickness of approximately 40 μm on the surface of the elastic layer 21*b*** to improve releasability.

The pressure roller 21 is biased toward the fixing belt 20 by a biasing member and pressed against the heater 22 via the fixing belt 20. Thus, the fixing nip N is formed between the fixing belt 20 and the pressure roller 21. A driver drives and rotates the pressure roller 21 in a direction indicated by arrow in FIG. 2, and the rotation of the pressure roller 21 rotates the fixing belt 20.

The heater 22 is arranged to contact the inner circumferential surface of the fixing belt 20. The heater 22 in the present embodiment contacts the pressure roller 21 via the fixing belt 20 and serves as a nip formation pad to form the fixing nip N between the pressure roller 21 and the fixing belt 20. The fixing belt 20 is a heated member heated by the heater 22. In other words, the heater 22 heats the sheet P passed through the fixing nip N via the fixing belt 20.

The heater 22 is a planar heating body extending in the longitudinal direction thereof parallel to the width direction of the fixing belt 20. The heater 22 includes a planar base 30, resistive heat generators 31 arranged on the base 30, and an insulation layer 32 covering the resistive heat generators 31. The insulation layer 32 of the heater 22 contacts the inner circumferential surface of the fixing belt 20, and the heat generated from the resistive heat generators 31 is transmitted to the fixing belt 20 through the insulation layer 32. Although the resistive heat generators 31 and the insulation layer 32 are arranged on the side of the base 30 facing the fixing belt 20 (that is, the fixing nip N) in the present embodiment, the resistive heat generators 31 and the insulation layer 32 may be arranged on the opposite side of the base 30, that is, the side facing the heater holder 23. In this case, since the heat of the resistive heat generator 31 is transmitted to the fixing belt 20 through the base 30, it is preferable that the base 30 be made of a material with high thermal conductivity such as aluminum nitride. Making the base 30 with the material having the high thermal conductivity enables to sufficiently heat the fixing belt 20 even if the resistive heat generators 31 are arranged on the side of the base 30 opposite to the side facing the fixing belt 20.

The heater holder 23 and the stay 24 are arranged inside a loop of the fixing belt 20. The stay 24 is configured by a channeled metallic member, and both side plates of the fixing device 9 support both end portions of the stay 24 in the longitudinal direction of the stay 24. Since the stay 24 supports the heater holder 23 and the heater 22, the heater 22 reliably receives a pressing force of the pressure roller 21 pressed against the fixing belt 20. Thus, the fixing nip Nis stably formed between the fixing belt 20 and the pressure roller 21. In the present embodiment, the thermal conductivity of the heater holder 23 is set to be smaller than the thermal conductivity of the base 30.

Since the heater holder 23 is heated to a high temperature by heat from the heater 22, the heater holder 23 is preferably made of a heat resistant material. The heater holder 23 made of heat-resistant resin having low thermal conduction, such as a liquid crystal polymer (LCP) or PEEK, reduces heat transfer from the heater 22 to the heater holder 23. Thus, the heater 22 can effectively heat the fixing belt 20.

The heater holder 23 has a recessed portion 23*b* for holding the heater 22.

As illustrated in FIG. 2, the heater holder 23 is integrally provided with guide ribs 26 that guide the fixing belt 20. The plurality of guide ribs 26 is disposed in the longitudinal direction on each of the upstream side and the downstream side in the sheet conveyance direction of the heater holder 23.

Each guide rib 26 has a substantial fan shape. Each guide rib 26 is disposed along the inner circumferential surface of the fixing belt 20, and has an arc-shaped or convex curved guide surface 260 extending in the belt circumferential direction.

The heater holder 23 has openings 23*a* extending through the heater holder 23 in the thickness direction thereof. The thermistor 25 and a thermostat which is described later are arranged in the openings 23*a*. The thermistor 25 and the thermostat are pressed by a spring and pressed against the back surface of the base 30 to detect the temperature of the heater 22. As described later, the fixing device 9 is provided with an end-side thermistor 25A and a center-side thermistor 25B, which are referred to as thermistors 25.

When the fixing device 9 according to the present embodiment starts printing, the pressure roller 21 is driven to rotate, and the fixing belt 20 starts to be rotated. At this time, the inner peripheral surface of the fixing belt 20 comes into contact with and is guided by the guide surface 260 of the guide rib 26, so that the fixing belt 20 rotates stably and smoothly. As power is supplied to the resistive heat generators 31 of the heater 22, the heater 22 heats the fixing belt 20. When the temperature of the fixing belt 20 reaches a predetermined target temperature which is called a fixing temperature, as illustrated in FIG. 2, the sheet P bearing an unfixed toner image is conveyed to the fixing nip N between the fixing belt 20 and the pressure roller 21, and the unfixed toner image is heated and pressed to be fixed to the sheet P.

Figure 3:
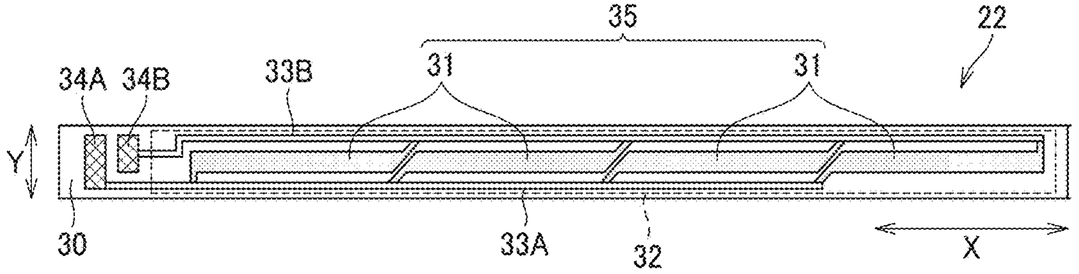
FIG. 3 is a plan view of a heater.

Next, a more detailed configuration of the heater arranged in the above-described fixing device is described with reference to FIG. 3. FIG. 3 is a plan view of the heater according to the present embodiment.

As illustrated in FIG. 3, the heater 22 includes a planar base 30. On the surface of the base 30, a plurality of resistive heat generators 31 (four resistive heat generators 31), power supply lines 33A and 33B that are conductors, a first electrode 34A, and a second electrode 34B are arranged. However, the number of resistive heat generators 31 is not limited to four in the present embodiment. Hereinafter, the power supply lines 33A and 33B are also referred to as power supply lines 33, and the first electrode 34A and the second electrode 34B are also referred to as electrodes 34.

The longitudinal direction of the heater 22 and the like, which is a direction orthogonal to the sheet of FIG. 2, and the horizontal direction X of FIG. 3 is also an arrangement direction of the plurality of resistive heat generators 31. Hereinafter, the direction X is also simply referred to as the arrangement direction. In addition, a direction that intersects the arrangement direction of the plurality of resistive heat generators 31 and is different from a thickness direction of the base 30 is referred to as a direction intersecting the arrangement direction. In the present embodiment, the direction intersecting the arrangement direction is the vertical direction Y in FIG. 3. The direction Y intersecting the arrangement direction is a direction along the surface of the base 30 on which the resistive heat generators 31 are arranged and is also a short-side direction of the heater 22 and a conveyance direction of the sheet P passed through the fixing device 9.

The plurality of resistive heat generators 31 configures a plurality of heat generation portions 35 divided in the arrangement direction. The resistive heat generators 31 are electrically connected in parallel to the pair of electrodes 34A and 34B via power supply lines 33A and 33B. The pair of electrodes 34A and 34B is arranged on one end of the base 30 in the arrangement direction that is a left end of the base 30 in FIG. 3. The power supply lines 33A and 33B are made of conductors having an electrical resistance value smaller than an electrical resistance value of the resistive heat generator 31. A gap area between neighboring resistive heat generators 31 is preferably 0.2 mm or more, more preferably 0.4 mm or more from the viewpoint of maintaining the insulation between the neighboring resistive heat generators 31. If the gap area between the neighboring resistive heat generators 31 is too large, the gap area is likely to cause temperature decrease in the gap area. Accordingly, from the viewpoint of reducing the temperature unevenness in the arrangement direction, the gap area is preferably equal to or shorter than 5 mm, and more preferably equal to or shorter than 1 mm.

The resistive heat generator 31 is made of a material having a positive temperature coefficient (PTC) of resistance that is a characteristic that the resistance value increases to decrease the heater output as the temperature T increases.

Dividing the heat generation portion 35 configured by the resistive heat generators 31 having the PTC characteristic in the arrangement direction prevents overheating of the fixing belt 20 when small sheets pass through the fixing device 9. When the small sheets each having a width smaller than the entire width of the heat generation portion 35 pass through the fixing device 9, the temperature of a region of the resistive heat generator 31 corresponding to a region of the fixing belt 20 outside the small sheet increases because the small sheet does not absorb heat of the fixing belt 20 in the region outside the small sheet that is the region outside the width of the small sheet. Since a constant voltage is applied to the resistive heat generators 31, the temperature increase in the regions outside the width of the small sheets causes the increase in resistance values of the resistive heat generators 31. The temperature increase relatively reduces outputs (that is, heat generation amounts) of the heater in the regions, thus restraining an increase in temperature in the regions that are end portions of the fixing belt outside the small sheets. Electrically coupling the plurality of resistive heat generators 31 in parallel can restrain temperature rises in non-sheet passage regions while maintaining the print speed. The heat generator that configures the heat generation portion 35 may not be the resistive heat generator having the PTC characteristic. The resistive heat generators in the heater 22 may be arranged in a plurality of rows arranged in the direction intersecting the arrangement direction.

The resistive heat generator 31 is produced by, for example, mixing silver-palladium (AgPd), glass powder, and the like into a paste. The paste is coated on the base 30 by screen printing or the like. Thereafter, the base 30 is fired to form the resistive heat generator 31. The resistive heat generators 31 each have a resistance value of 80 Ω at room temperature, in the present embodiment. The material of the resistive heat generators 31 may contain a resistance material, such as silver alloy (AgPt) or ruthenium oxide ($RuO_2$), other than the above material. Silver (Ag), silver palladium (AgPd) may be used as a material of the power supply lines 33A and 33B and the electrodes 34A and 34B. Screen-printing such a material forms the power supply lines 33A and 33B and the electrodes 34A and 34B. The power supply lines 33A and 33B are made of conductors having the electrical resistance value smaller than the electrical resistance value of the resistive heat generators 31.

The material of the base 30 is preferably a nonmetallic material having excellent thermal resistance and insulating properties, such as glass, mica, or ceramic such as alumina or aluminum nitride. The heater 22 according to the present embodiment includes an alumina base having a thickness of 1.0 mm, a width of 270 mm in the arrangement direction, and a width of 8 mm in the direction intersecting the arrangement direction. The base 30 may be made by layering the insulation material on conductive material such as metal. Low-cost aluminum or stainless steel is favorable as the metal material of the base 30. The base 30 made of a stainless steel plate is resistant to cracking due to thermal stress. To improve thermal uniformity of the heater 22 and image quality, the base 30 may be made of a material having high thermal conductivity, such as copper, graphite, or graphene.

The insulation layer 32 may be, for example, a thermal resistance glass having a thickness of 75 μm. The insulation layer 32 covers the resistive heat generators 31 and the power supply lines 33A and 33B to insulate and protect the resistive heat generators 31 and the power supply lines 33A and 33B and maintain sliding performance with the fixing belt 20.

Figure 4:
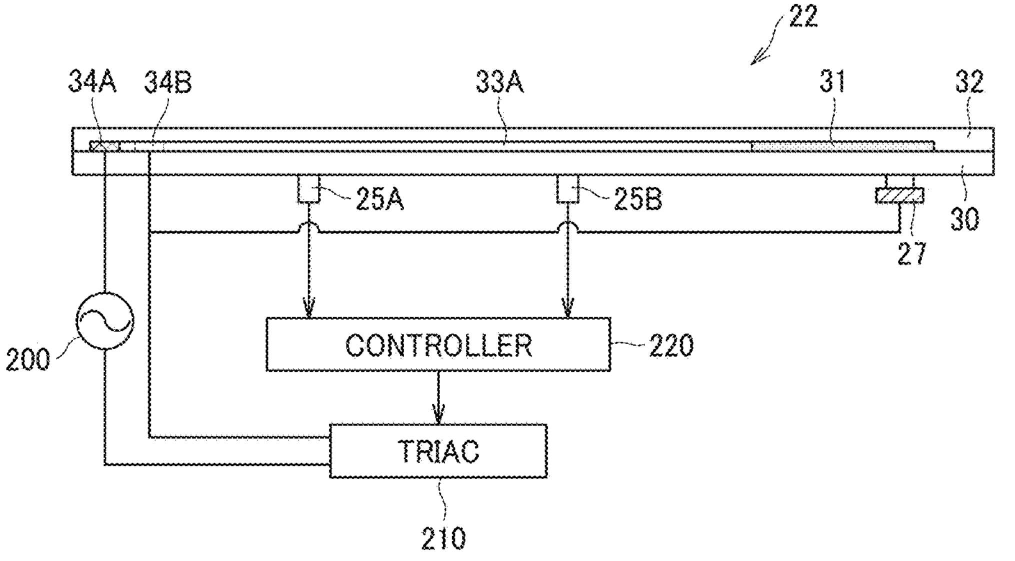
FIG. 4 is a diagram illustrating power supply to the heater.

FIG. 4 is a schematic diagram illustrating a circuit to supply power to the heater according to the present embodiment.

As illustrated in FIG. 4, an alternating current power supply 200 is electrically coupled to the electrodes 34A and 34B of the heater 22 to configure a power supply circuit in the present embodiment to supply power to the resistive heat generators 31. The power supply circuit includes a triac 210 that controls an amount of power supplied. The amount of power supplied to each resistive heat generator 31 is controlled by a controller 220 via the triac 210 based on the temperatures detected by the thermistors 25A and 25B. The controller 220 includes a microcomputer including, for example, a central processing unit (CPU), a read only memory (ROM), a random access memory (RAM), an input and output (I/O) interface. The controller 220 may be disposed in the fixing device or may be disposed in the main body of the image forming apparatus.

In the present embodiment, the end-side thermistor 25A as a first temperature detector is arranged on one end side in the arrangement direction of the heater 22, and the center-side thermistor 25B as a second temperature detector is arranged in the central region in the arrangement direction of the heater 22 within the minimum sheet passage width. Furthermore, arranged on the other end side in the arrangement direction of the heater 22 is a thermostat 27 as a power shutoff unit that shuts off power supply to the resistive heat generators 31 if the temperature of the resistive heat generators 31 become equal to or higher than a predetermined temperature. The thermistors 25 and the thermostat 27 are in contact with the back surface of the base material of the heater to detect the temperature of the heater. Hereinafter, the end-side thermistor 25A and the center-side thermistor 25B will also be referred to as thermistors 25.

Figure 5:
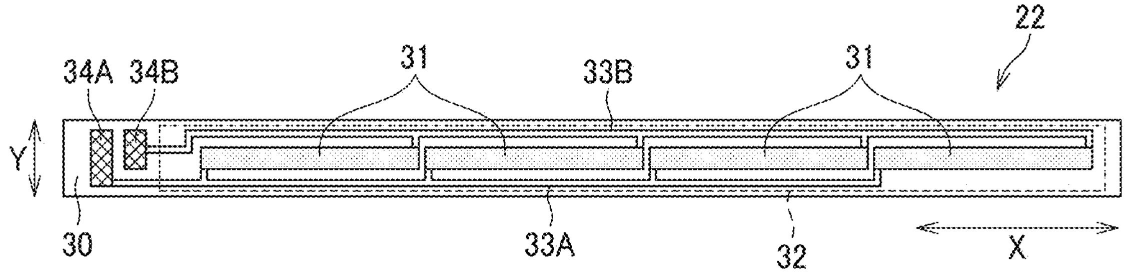
FIG. 5 is a plan view of a heater in which the shape of a resistive heat generator is different from that in FIG. 3.
Figure 6:
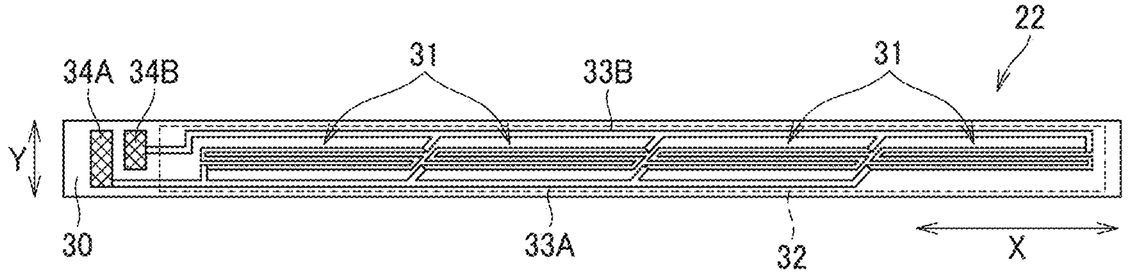
FIG. 6 is a plan view of a heater in which the shape of a resistive heat generator is different from those in FIGS. 3 and 5.

The first electrode 34A and the second electrode 34B are arranged on the same end portion of the base 30 in the arrangement direction in the present embodiment but may be arranged on both end portions of the base 30 in the arrangement direction. The shape of resistive heat generators 31 is not limited to the shape in the present embodiment. For example, as illustrated in FIG. 5, the shape of resistive heat generators 31 may be a rectangular shape, or as illustrated in FIG. 6, the resistive heat generators 31 may be configured by a linear portion folding back to form a substantially parallelogram shape. In addition, as illustrated in FIG. 5, portions each extending from the resistive heat generators 31 having a rectangular shape to one of the power supply lines 33A and 33B (the portion extending in the direction intersecting the arrangement direction) may be a part of the resistive heat generator 31 or may be made of the same material as the power supply lines 33A and 33B.

The above-described fixing device or a conveyance apparatus such as an image forming apparatus including the fixing device has the following three problems.

First, there is a first problem that if a sheet of size different from the size in the sheet passage mode of the image forming apparatus is passed, the fixing belt 20 may become damaged due to an excessive temperature rise on the end side of the fixing belt 20. That is, if a sheet of a size smaller than the size set in the sheet passage mode is passed, the region of heat generation in the width direction by the resistive heat generators 31 becomes larger than the region of sheet passage. Therefore, since the heat of the fixing belt 20 is not deprived by the sheet in the non-sheet passage region and the region of heat generation by the resistive heat generators 31, the fixing belt 20 may be excessively heated to cause damage. Hereinafter, this problem will be referred to as problem 1. In the present embodiment, a side fence disposed in the sheet feeding tray is brought into contact with the side ends of the sheets placed in the sheet feeding tray. Then, the image forming apparatus recognizes the sheet size in the sheet feeding tray based on the position of the side fence. However, if the worker does not adjust the position of the side fence in accordance with the side ends of the sheets set in the sheet feed tray, the image forming apparatus cannot correctly recognize the sheet size. Thus, the image forming operation will be started even if sheets of different size are set in the sheet feed tray. Therefore, sheets of different size as described above may pass through the fixing device.

As a second problem, in addition to the problem 1, when the user sets sheets in the sheet feeding tray of the image forming apparatus, the set position may be shifted. That is, the center position in the width direction of the sheets actually stacked may be different from the center position in the width direction of the sheet feeding tray, so that the image transferred to the sheets may also be shifted in position. Hereinafter, this problem is referred to as problem 2. Then, if the image forming operation is continuously performed on the sheets, such a positional shift similarly occurs on the subsequent sheets. It is thus necessary to quickly detect the positional shift and stop the image forming operation.

As a third problem, there is a temperature drop at the end of a sheet in the fixing device. For example, if the image forming apparatus is raised from a cooled state, the temperature rise of the fixing belt 20 is delayed at the end portion side in the width direction as compared with the center side. Therefore, the end side of the sheet passed through the fixing nip N is not sufficiently heated as compared to the central portion, which may cause a fixing failure on the end side. Hereinafter, this problem will be referred to as problem 3.

In order to solve these problems, in the present embodiment, the above-described end-side thermistor and center-side thermistor, and the sheet passage detection sensor as a recording medium detector are provided. Hereinafter, these components will be described with reference to FIG. 7.

Figure 7:
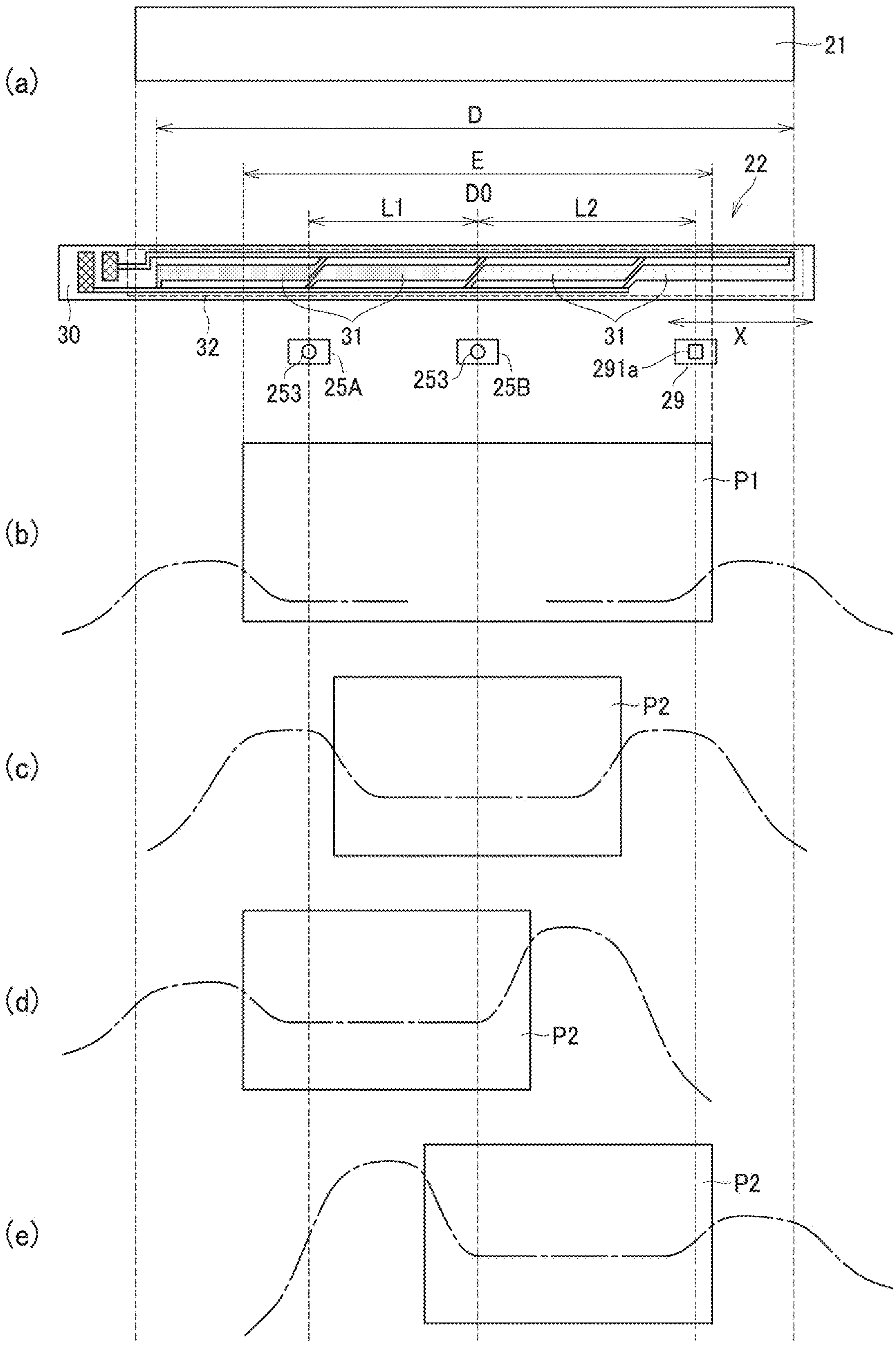
FIG. 7 includes part (a) that is a diagram illustrating an arrangement relationship among members in a width direction and parts (b), (c), (d), and (e) that are diagrams illustrating a positional relationship between a sheet and a temperature distribution of the heater in the width direction in corresponding states.

The horizontal direction X in part (a) of FIG. 7 is the width direction of the sheet, which is the same direction as the longitudinal direction of the fixing belt or the arrangement direction of the resistive heat generators described above. The width direction X is a conveyance orthogonal direction which is a direction orthogonal to the conveyance direction of the sheet and is a direction along the surface of the sheet. The surface of the sheet is a surface parallel to the sheet of part (a) of FIG. 7. Hereinafter, the horizontal direction X will also be simply referred to as width direction.

As illustrated in part (a) of FIG. 7, the end-side thermistor 25A as a first temperature detector, the center-side thermistor 25B as a second temperature detector, and the sheet passage detection sensor 29 as a recording medium detector are disposed at positions corresponding to a heating region D which is the main heat generation region of the heater 22. The heating region D is a region where the resistive heat generators 31 are disposed in the width direction X, and is also a region of heating by the heater 22 in the width direction.

In the present embodiment, the end-side thermistor 25A and the center-side thermistor 25B are disposed in the fixing device 9, and the sheet passage detection sensor 29 is disposed in the sheet feeding tray 16 (see FIG. 1) of the sheet feeding device 7. That is, the width-direction positions of the end-side thermistor 25A, the center-side thermistor 25B, and the sheet passage detection sensor 29 illustrated in part (a) of FIG. 7 indicate positions with reference to a center position DO which is a reference position as seen in the width direction of the sheet in each device. The sheets of each size are set in the paper feeding tray such that the width-direction center position of the sheets matches the center position DO. That is, the center position DO is a center position as seen in the width direction of the sheets arranged without positional shift on the conveyance path in the sheet feeding device or the image forming apparatus. The center position DO is also a center position of the heating region D in the width direction. The center position DO, which is the width-direction center position of the sheet or the center position of the heating region D of the heater 22, will be hereinafter also simply referred to as center position DO.

An image forming apparatus including the fixing device having the end-side thermistor 25A and the center-side thermistor 25B and the sheet feeding device having the sheet passage detection sensor 29 is the conveyance apparatus in the present embodiment. However, the conveyance apparatus of the present disclosure is not limited to the image forming apparatus. For example, a heating apparatus including a heating body may be the conveyance device in the present disclosure. That is, as the conveyance apparatus, the heating apparatus may include the first temperature detector, the second temperature detector, and the recording medium detector. The fixing device 9 of the present embodiment is a mode of a heating apparatus. In addition, the recording medium detector can be disposed at an appropriate position in the range from the position of the recording medium stacked in the image forming apparatus to the position of the recording medium discharged to the outside of the apparatus. In addition, the fixing device in the image forming apparatus and another device having the recording medium detector may be combined to form the conveyance device of the present disclosure.

A more detailed configuration of the thermistors 25 will be described with reference to FIG. 8. The end-side thermistor 25A and the center-side thermistor 25B are the same in configuration except that the arrangement in the width direction is different. However, the end-side thermistor 25A and the center-side thermistor 25B are not necessarily the same in configuration.

Figure 8:
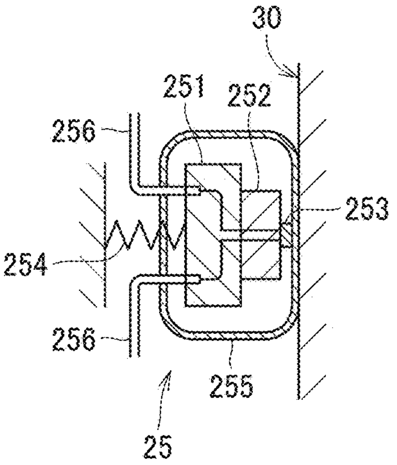
FIG. 8 is a cross-sectional view of a thermistor.

As illustrated in FIG. 8, the thermistor 25 includes a holder 251, an elastic member 252, a temperature detecting element 253 as a temperature detector, a spring 254 as a biasing member, and an insulating sheet 255.

The holder 251 is made of a resin material such as LCP. The temperature detecting element 253 is disposed on the surface of the heater of the holder 251 facing the base material of the heater with the elastic member 252 in between. The elastic member 252 is made of a material lower in thermal conductivity and rigidity than the holder 251, and has elasticity and heat insulating properties. The insulating sheet 255 is made of an insulating material such as polyimide (PI), and is disposed so as to cover the holder 251, the elastic member 252, and the temperature detecting element 253. The holder 251 is biased toward the heater 22 by the spring 254, whereby the temperature detecting element 253 is in contact with the heater 22 with the insulating sheet 255 in between. In addition, two wires 256 are connected to the temperature detecting element 253 and extend from the holder 251. Each wire 256 is covered with an insulating film. The film of each wire 256 desirably has a thickness of 0.4 mm or more in consideration of heat resistance, for example. If the thickness of the film is 0.4 mm or less, a plurality of films may be stacked.

Figure 9:
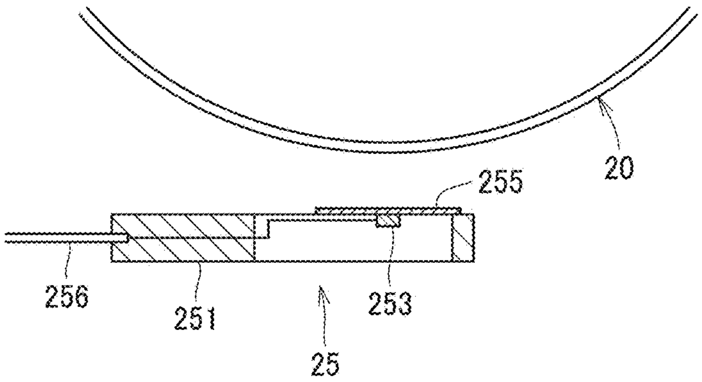
FIG. 9 is a cross-sectional view of a thermistor different from that in FIG. 8.

The thermistor 25 may be a non-contact type temperature detector. For example, as illustrated in FIG. 9, the non-contact thermistor 25 includes the holder 251, the temperature detecting element 253, and the insulating sheet 255. As an example, the thermistor 25 is arranged on the upstream side in the sheet conveyance direction, which is under the fixing nip N in FIG. 2. However, the thermistor 25 may be arranged downstream of the fixing nip N.

The temperature detecting element 253 is disposed in the holder 251 and faces the outer peripheral surface of the fixing belt 20 with the insulating sheet 255 in between. The two wires 256 held by the holder 251 are connected to the temperature detecting element 253 on one hand and extend to the outside of the thermistor 25 on the other hand. Since the thermistor 25 does not require heat resistance as compared with a contact thermistor, the holder 251 can be formed of a material having lower heat resistance, or the elastic member can be omitted. The thermistor 25 also does not require a biasing member for biasing the temperature detecting element 253.

In addition, the first temperature detector and the second temperature detector may detect the temperature of another member in contact with the heater 22. For example, a first high thermal conduction member 28 (see FIG. 11) described later may be disposed between the heater 22 and the thermistor 25, and the thermistor 25 may detect the temperature of the first high thermal conduction member 28. "The thermistor 25 detects the temperature of the heater 22" may be a case where the thermistor 25 detects the temperature of the heater 22 via another member as described above.

Figure 10A:
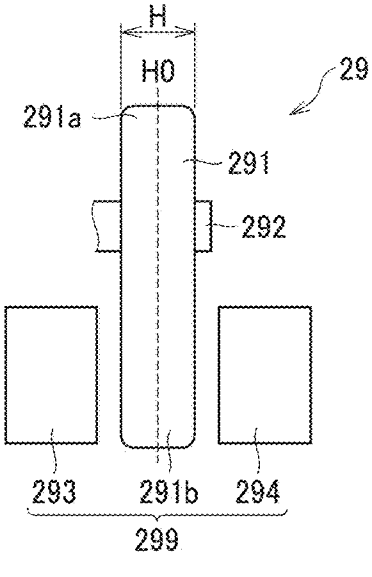
FIG. 10A is a front view of a whole sheet passage detection sensor.
Figure 10B:
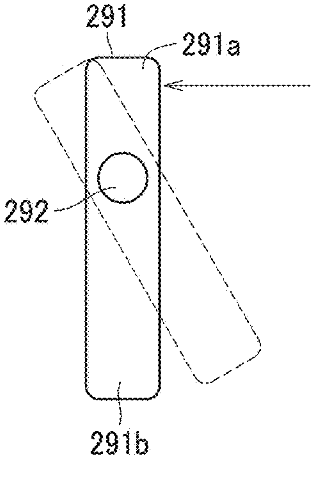
FIG. 10B is a side view of a shielding member in rotating operation.

FIGS. 10A and 10B illustrate an example of the sheet passage detection sensor 29.

As illustrated in FIG. 10A, the sheet passage detection sensor 29 includes a light shielding member 291, a shaft 292, a light emitting device 293, and a light receiving device 294.

As illustrated in FIG. 10B, the light shielding member 291 rotates about the shaft 292. An abutment part 291*a* which is one end portion of the light shielding member 291 is arranged on a sheet passage path in the image forming apparatus, in particular, on a sheet passage path in the sheet feeding tray 16 in the present embodiment. If the sheet is conveyed in the arrow direction of FIG. 10B, the abutment part 291*a* abuts on the sheet, and the light shielding member 291 rotates.

Switching between the posture of the light shielding member 291 not pressed by the sheet, which is indicated by the solid line in FIG. 10B, and the posture of the light shielding member 291 rotating by being pressed by the sheet, which is indicated by the dotted line in FIG. 10B, allows the other end portion 291*b* of the light shielding member 291 illustrated in FIG. 10A to be switched between a state of shielding the light from the light emitting device 293 and a state of not shielding the light from the light emitting device 293. That is, the detection state can be switched depending on whether the sheet is passed. The light emitting device 293, the other end portion 291*b*, and the light receiving device 294 constitute a photocoupler 299. A region H in which the abutment part 291*a* is disposed in the width direction is a sheet passage detection region H of the sheet passage detection sensor 29. A dotted line HO in FIG. 10A indicates the center position of the sheet passage detection region H in the width direction.

FIGS. 10A and 10B illustrate a transmissive optical sensor as the sheet passage detection sensor 29, but a reflective optical sensor may be used instead. In addition, an appropriate mechanism can be used as the recording medium detector, such as a push-button detection sensor that presses a button by a sheet conveyed on the conveyance path, and a magnetic sensor that changes a detection state by a rotation operation of a rotator pressed by a sheet conveyed on the conveyance path.

As illustrated in parts (a) and (b) of FIG. 7, the heating region D is provided larger than a sheet passage region E of a sheet P1 having the maximum width to be passed through the fixing device. This alleviates the above-described temperature drop on the end side of the sheet passage region E. Hereinafter, the sheet passage region E of the sheet P1 having the maximum width will be referred to as maximum sheet passage region E as the maximum passage region. The end-side thermistor 25A, the center-side thermistor 25B, and the sheet passage detection sensor 29 are disposed in the maximum sheet passage region E. In the present embodiment, in particular, the sheet passage detection sensor 29 is disposed inside the maximum sheet passage region E and outside the sheet passage region of the sheet having the second largest width after the sheet P1 having the largest width.

The end-side thermistor 25A is disposed at a position farther from the center position DO than the center-side thermistor 25B. That is, the center-side thermistor 25B is a thermistor that detects a center part of the heating region D. For example, when the heating region D is divided into three in the width direction, the temperature detecting element 253 of the center-side thermistor 25B is arranged at a position corresponding to the center part. In the present embodiment, in particular, the temperature detecting element 253 of the center-side thermistor 25B is disposed at the same position as the center position DO. For example, the temperature detecting element 253 of the end-side thermistor 25A is arranged at a position corresponding to a part on one end side of the heating region D divided into three in the width direction. In the present embodiment, the temperature detecting element 253 of the end-side thermistor 25A is arranged at a position at a distance L1 in the width direction from the center position DO. In other words, the temperature detecting element 253 of the end-side thermistor 25A is arranged at a position of the distance L1 in the width direction from the temperature detecting element 253 of the center-side thermistor 25B.

The sheet passage detection sensor 29 is disposed on the side opposite to the end-side thermistor 25A with respect to the center position DO. That is, no thermistor is provided but the sheet passage detection sensor 29 alone is disposed on one side with respect to the center position DO. In the present embodiment, the center position of the abutment part 291*a* of the sheet passage detection sensor 29 as seen in the width direction is arranged at a position of a distance L2 in the width direction from the center position DO. That is, the center position HO (see FIG. 10A) of the sheet passage detection region H of the sheet passage detection sensor 29 is arranged at the position of the distance L2 in the width direction from the center position D0.

The distance L2 is set to be longer than the distance L1. That is, the sheet passage detection sensor 29 is disposed at a position closer to the end of the maximum sheet passage region E than the position of the end-side thermistor 25A.

In the present embodiment, the above-described problems 1 to 3 can be solved by the end-side thermistor 25A, the center-side thermistor 25B, and the sheet passage detection sensor 29 described above. Methods for solving these problems will be described with reference to FIG. 7. Curves indicated by alternate long and short dash lines in parts (b), (c), (d), and (e) of FIG. 7 indicate the temperature of the base material of the heater 22 at several positions in the width direction. That is, the end-side thermistor 25A or the center-side thermistor 25B detects the temperature at the corresponding position in the width direction on the one-dot chain line. The heater and the fixing belt also show a similar temperature tendency.

First, part (b) of FIG. 7 illustrates a case where the problem 1 and the problem 2 do not occur. That is, in the sheet passage mode of the sheet with the maximum width, the sheet P1 with the maximum width is set and passed in the sheet feeding device without a positional shift. In this case, as illustrated in part (b) of FIG. 7, since the heat of the heater 22 and the fixing belt is deprived by the sheet at the positions of the end-side thermistor 25A and the center-side thermistor 25B arranged in the width direction, the temperatures detected by the end-side thermistor 25A and the center-side thermistor 25B are similar to each other. The sheet passage detection sensor 29 detects that the sheet P1 has been passed. As a result, the controller can determine that the sheet has been normally passed and the image forming operation has been performed on the apparatus side.

Part (c) of FIG. 7 illustrates a case where the problem 1 occurs. That is, this is a case where the sheet P2 with a width smaller than that of the sheet with the maximum width has been erroneously passed through the fixing device in the sheet passage mode of the sheet with the maximum width. In this case, as illustrated in part (c) of FIG. 7, the heat of the heater 22 and the fixing belt is deprived by the sheet P2 at the position of the center-side thermistor 25B arranged in the width direction. On the other hand, the sheet P2 is not located at the position of the end-side thermistor 25A arranged in the width direction, and the heat of the heater 22 and the fixing belt is not deprived. As a result, the temperature detected by the end-side thermistor 25A is higher than the temperature detected by the center-side thermistor 25B. This allows the controller to detect an anomaly on the end portion side. That is, the controller can recognize that the temperature on the end side of the heater 22 is higher than that on the center side due to the problem 1 of an error in the paper size. Specifically, if the temperature detected by the end-side thermistor 25A is higher than the temperature detected by the center-side thermistor 25B by a predetermined numerical value or more, the controller is allowed to recognize that the anomaly has been caused by the problem 1 or the like. Further, the sheet does not pass through the position of the sheet passage detection sensor 29, and the sheet passage detection sensor 29 does not detect the sheet. Therefore, the controller can also recognize the occurrence of the anomaly such as the problem 1 from the detection result.

Part (d) of FIG. 7 illustrates a case where the problem 2 occurs in addition to the problem 1. That is, in addition to the error in the sheet size in part (c) of FIG. 7, the position of the sheet P2 is shifted to the left in part (c) of FIG. 7 due to an error in the setting position of the sheet in the sheet feed tray. In this case, as illustrated in part (d) of FIG. 7, since the heat of the heater 22 and the fixing belt is deprived by the sheet at the positions of the end-side thermistor 25A and the center-side thermistor 25B arranged in the width direction, the temperatures detected by the end-side thermistor 25A and the center-side thermistor 25B are similar to each other. That is, the controller cannot recognize the anomaly depending on the result of detection by the end-side thermistor 25A. However, since the sheet P2 does not pass through the position of the sheet passage detection sensor 29 arranged in the width direction, the sheet passage detection sensor 29 does not detect the sheet. As a result, the controller can recognize that the anomaly of the problem 1 or the problem 2 has occurred.

Finally, part (e) of FIG. 7 illustrates a case where the problem 1 and the problem 2 occur as in part (d) of FIG. 7, and an error occurs in the setting position of the sheet P2 in the direction opposite to that in part (e) of FIG. 7. In this case, as illustrated in part (e) of FIG. 7, the heat of the heater 22 and the fixing belt is deprived by the sheet P2 at the position of the center-side thermistor 25B arranged in the width direction. On the other hand, the sheet P2 is not located at the position of the end-side thermistor 25A arranged in the width direction, and the heat of the heater 22 and the fixing belt is not deprived. As a result, the temperature detected by the end-side thermistor 25A is higher than the temperature detected by the center-side thermistor 25B. As a result, the controller can recognize that the anomaly of the problem 1 or the problem 2 has occurred. The sheet P2 is passed at the position of the sheet passage detection sensor 29, and the sheet passage detection sensor 29 detects the sheet. That is, the controller cannot recognize the anomaly from the detection result of the sheet passage detection sensor 29.

As described above, providing the end-side thermistor 25A, the center-side thermistor 25B, and the sheet passage detection sensor 29 allows the controller to recognize the anomaly even if the sheet setting position is shifted to any side.

In addition, it is possible to detect the temperature drop as in the problem 3 from the result of detection by the end-side thermistor 25A. In this case, fixing failure can be prevented by setting an extra time of heating by the heater 22.

As described above, the controller can recognize anomalies of the problems 1 to 3 based on the results of detection by the end-side thermistor 25A, the center-side thermistor 25B, and the sheet passage detection sensor 29. Therefore, if the problem 1 or the problem 2 occurs, the image forming operation can be stopped more quickly, and the fixing belt 20 can be prevented from being damaged. In addition, a fixing failure due to a temperature drop of the problem 3 can be prevented. In addition, for example, as compared with a configuration in which thermistors are arranged on both sides in the width direction of the fixing belt 20, in the present embodiment, a sheet passage detection sensor that is less expensive than the thermistors is arranged on one side, so that the cost of the conveyance apparatus and the image forming apparatus can be reduced accordingly. Therefore, with the configuration of the present embodiment, it is possible to prevent the rotator from being damaged due to an increase in the temperature of the end portion at low cost and to suppress a temperature drop in the end portion of the rotator.

In the present embodiment, as described above, the sheet passage detection sensor 29 is arranged at a position farther from the center position DO than the end-side thermistor 25A. That is, the distance L2 is set to be longer than the distance L1. The sheet passage detection sensor 29 may be arranged at a position that the sheet passage detection sensor 29 does not detect the sheet if the sheet is shifted to the left in FIG. 7 due to an error in the sheet setting position. Therefore, the sheet passage detection sensor 29 can be arranged closer to the end of the maximum sheet passage region E. On the other hand, the end-side thermistor 25A determines a non-sheet passage state by using the fact that the temperature of the non-sheet passage region is higher than that of the sheet passage region. Therefore, it is necessary to provide a certain distance from the end of the maximum sheet passage region E. That is, even in the case of part (b) of FIG. 7 in which there is no anomaly in the sheet size and the sheet setting position, the temperature of the heater 22 becomes higher in the vicinity of the end of the maximum sheet passage region E than that in the center due to heat transfer from the non-sheet passage region. Therefore, if the end-side thermistor 25A is arranged at a position close to the end of the maximum sheet passage region E, the detection temperature of the end-side thermistor 25A may become high even without an anomaly as illustrated in part (b) of FIG. 7, and the controller may recognize this temperature rise as an anomaly. That is, the controller cannot correctly determine whether the sheet is in the non-passage state. As described above, in the present embodiment, the end-side thermistor 25A and the sheet passage detection sensor 29 are arranged at appropriate positions in the width direction according to their respective characteristics. This allows the end-side thermistor 25A and the sheet passage detection sensor 29 to detect the presence or absence of sheet passage more normally.

As described above, in the present embodiment, it is possible to solve the problem 2 by arranging the end-side thermistor 25A on one side in the width direction and arranging the sheet passage detection sensor 29 on the other side. That is, in the present embodiment, the sheet passage detection sensor 29 can detect the shift of the sheet to the left in FIG. 7, and the end-side thermistor 25A and the center-side thermistor 25B can detect the shift of the sheet to the other side in the width direction. Therefore, if the sheet is shifted in any direction due to the problem 2, it is possible to detect the anomaly and stop the subsequent image forming operation on the sheet. This eliminates execution of an unnecessary image forming operation.

In particular, the sheet passage detection sensor 29 can detect an anomaly more quickly than the end-side thermistor 25A. That is, the end-side thermistor 25A detects an anomaly due to an increase in the detected temperature, which means that the end-side thermistor 25A cannot detect an anomaly until the temperature of the end portion starts to rise. In comparison with this, the sheet passage detection sensor 29 can detect an anomaly from the first sheet. That is, in the case illustrated in part (c) or (b) of FIG. 7, the sheet passage detection sensor 29 can detect an anomaly from the first sheet.

As described above, the sheet passage detection sensor 29 is preferably arranged closer to the end side of the maximum sheet passage region E. However, if the sheet passage detection sensor 29 is arranged too close to the end of the maximum sheet passage region E, even with a slight positional shift occurring at the time of sheet conveyance, for example, the sheet is arranged at a position shifted from the sheet passage detection sensor 29, and the detection result becomes a non-sheet passage state. In consideration of the above, the sheet passage detection region H of the sheet passage detection sensor 29 is preferably arranged at a position of 1 mm to 5 mm from the position of the end of the sheet passage region E. It is also preferable to arrange the sheet at a distance longer than an error in the conveyance of the sheet. For example, if the error in the conveyance of the sheet is 2 mm at the maximum, the sheet passage detection region H of the sheet passage detection sensor 29 can be arranged at a position of 3 mm or more from the position of the end of the sheet passage region E, for example.

The sheet passage detection sensor 29 is preferably disposed upstream from the fixing device 9 in the sheet conveyance direction. This makes it possible to detect the anomaly of the problem 1 or 2 before the fixing device 9 performs the fixing operation of the toner image on the sheet. As described above, the sheet passage detection sensor 29 is preferably arranged upstream in the sheet conveyance direction to detect an anomaly quickly. In particular, as in the present embodiment, the sheet passage detection sensor 29 is more preferably disposed in the sheet feeding device to detect an anomaly more quickly.

The configuration of the present embodiment is preferably applied in particular to a fixing device including a fixing belt with no elastic layer. That is, in this fixing device, the amount of heat transfer in the longitudinal direction of the fixing belt decreases, and the temperature rise in the non-sheet passage portion increases. Therefore, the damage of the fixing belt due to the problem 1 becomes remarkable in particular. Therefore, according to the above configuration of the present embodiment, it is possible to effectively prevent damage of the fixing belt due to excessive temperature rise.

Since the sheet passage detection sensor 29 outside the fixing device 9, the sheet passage detection sensor 29 is not replaced at the time of replacement of the fixing device 9. This reduces the cost involved in the replacement of the fixing device 9.

Next, as an embodiment of a fixing device different from the fixing device of FIG. 2, a fixing device in which a high thermal conductive member is arranged between a heater holder 23 and a heater 22 will be described with reference to FIG. 11.

The first high thermal conduction member 28 is made of a material having a thermal conductivity higher than a thermal conductivity of the base 30. In the present embodiment, the first high thermal conduction member 28 is a plate made of aluminum. Alternatively, the first high thermal conduction member 28 may be made of copper, silver, graphene, or graphite, for example. The first high thermal conduction member 28 that is the plate can improve accuracy of positioning of the heater 22 with respect to the heater holder 23 and the first high thermal conduction member 28.

Next, a method of calculating the thermal conductivity is described. In order to calculate the thermal conductivity, the thermal diffusivity of an object to be measured is firstly measured. Using the thermal diffusivity, the thermal conductivity is calculated.

The thermal diffusivity is measured using a thermal diffusivity-and-conductivity measuring device (product name: ai-Phase Mobile 1u, manufactured by ai-Phase Co., Ltd.).

In order to convert the thermal diffusivity into thermal conductivity, values of density and specific heat capacity are necessary.

A dry automatic densitometer (trade name: Accupyc 1330, manufactured by Shimadzu Corporation) was used.

The specific heat capacity was measured by a differential scanning calorimeter (trade name: DSC-60 manufactured by Shimadzu Corporation), using sapphire as a reference substance having a known specific heat capacity. In the present embodiment, the specific heat capacity is measured five times, and an average value at 50° C. is used. The thermal conductivity λ is obtained by the following expression (1). λ=ρ×C×α. (1) where p is the density, C is the specific heat capacity, and a is the thermal diffusivity obtained by the thermal diffusivity measurement described above.

[Equation 1]

$$\lambda=\rho\times C\times\alpha \quad (1)$$

In the present embodiment, similarly to the above-described embodiments, problems 1 to 3 occur. Therefore, anomalies caused by the problems 1 to 3 can be detected and solved by arranging an end-side thermistor 25A and a center-side thermistor 25B to be brought into contact with the first high thermal conduction member 28 and arranging a sheet passage detection sensor 29. That is, the end-side thermistor 25A, the center-side thermistor 25B, and the sheet passage detection sensor 29 can detect an error in the size of the sheet or an error in the setting position and prevent a temperature rise at the end portion of a fixing belt 20. In addition, a temperature drop at the end portion can be detected by the end-side thermistor 25A. Therefore, it is possible to prevent the rotator from being damaged due to an increase in the temperature of the end portion at low cost and to suppress a temperature drop in the end portion of the rotator.

However, the first high thermal conduction member 28 and a second high thermal conduction member described later may have openings similar to the openings 23*a* to press the thermistor 25 and the thermostat against the back surface of the base 30. Providing the first high thermal conduction member 28 suppress temperature unevenness in the longitudinal direction of the heater 22. Therefore, an inexpensive thermistor with low heat resistance can be used as the thermistor 25.

Figure 12:
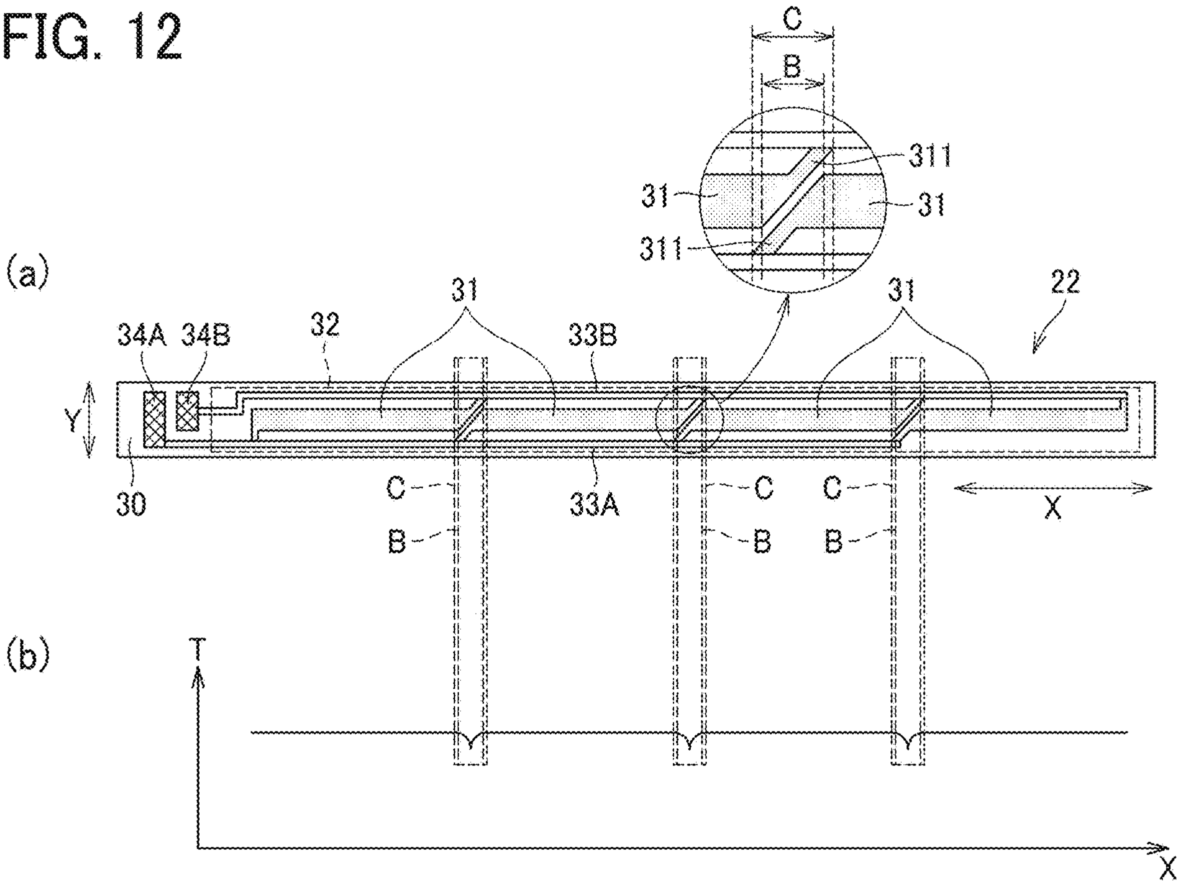
FIG. 12 includes part (a) that is a plan view of a heater and part (b) that is a diagram illustrating a temperature distribution in an arrangement direction of a fixing belt.

FIG. 12 is a diagram and graph illustrating a temperature distribution of the fixing belt 20 in the arrangement direction. Part (a) of FIG. 12 illustrates the arrangement of the heater 22. Part (b) of FIG. 12 represents temperature T of the fixing belt 20 on the vertical axis and represents the positions of the fixing belt 20 in the arrangement direction on the horizontal axis.

As illustrated in parts (a) and (b) of FIG. 12, a plurality of resistive heat generators 31 disposed in the heater 22 is separated in the arrangement direction to form a separation region B between the resistive heat generators 31. In other words, the heater 22 has the plurality of resistive heat generators 31 provided with a gap B therebetween. Hereinafter, the region B as separation region will be called gap B. The area of the gap B occupied by the resistive heat generators 31 is smaller than the areas of other parts occupied by the resistive heat generators 31. As a result, the temperature of the fixing belt 20 on the separation region B becomes smaller than the temperature of the fixing belt 20 on another area, which causes temperature unevenness in the arrangement direction of the fixing belt 20. In addition, the temperatures of the heater 22 and the fixing belt 20 are lower on an enlarged separation region C that includes a region around the gap B that is a separation region (hereinafter, simply called region C). Similarly, the temperature of the heater 22 becomes lower in the gap B. Here, as illustrated in the enlarged view of FIG. 12A, the gap B means an arrangement-direction region including the entire portion obtained by separating the resistive heat generator 31, which is the main heat generating portion of the heater 22, in the arrangement direction. In addition to the gap B, the heater 22 has the region C including an area corresponding to a connection portion 311 of the resistive heat generator 31. The connection portion 311 is defined as a portion of the resistive heat generator 31 that extends in the direction intersecting the arrangement direction and is connected to one of the power supply lines 33A and 33B.

Figure 13:
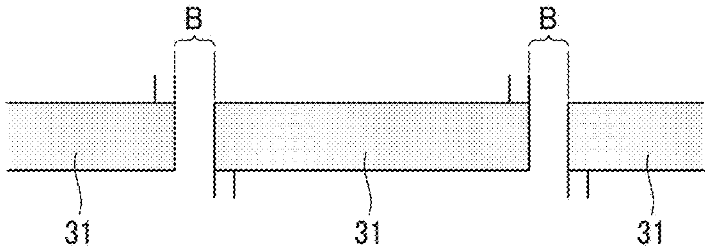
FIG. 13 is a diagram illustrating divided regions of the heater in FIG. 5.
Figure 14:
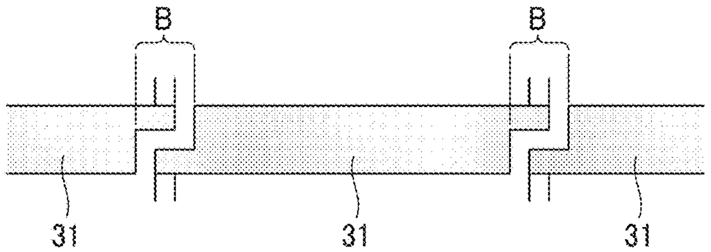
FIG. 14 is a diagram illustrating divided regions of a shape different from that in FIG. 13.
Figure 15:
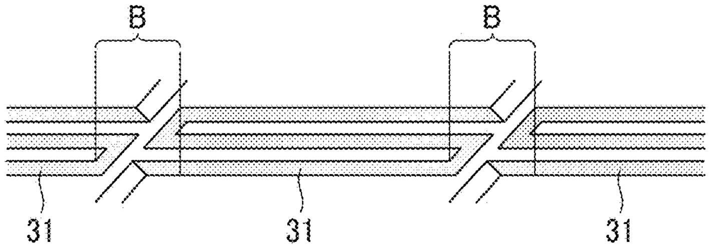
FIG. 15 is a view 15 illustrating divided regions of the heater in FIG. 6.

As illustrated in FIG. 13, the heater 22 including the rectangular resistive heat generators 31 illustrated in FIG. 5 also has the gaps B having lower temperatures than another area of the heat generation portion 35. In addition, the heater 22 including the resistive heat generators 31 having forms as illustrated in FIG. 14 has the gaps B with lower temperatures than another area of the heat generation portion 35. As illustrated in FIG. 15, the heater 22 including the resistive heat generators 31 having forms as illustrated in FIG. 6 has the gaps B with lower temperatures than another area of the heat generation portion 35. However, overlapping the resistive heat generators 31 lying next to each other in the arrangement direction as illustrated in parts (a) and (b) of FIGS. 12, 14, and 15 can reduce the above-described temperature drop that the temperature of the fixing belt 20 corresponding to the gap B is smaller than the temperature of the fixing belt 20 corresponding to an area other than the gap B.

The fixing device 9 in the present embodiment includes the first high thermal conduction member 28 described above in order to reduce the temperature drop corresponding to the gap as described above and reduce the temperature unevenness in the arrangement direction of the fixing belt 20. Next, a detailed description is given of the first high thermal conduction member 28.

Figure 11:
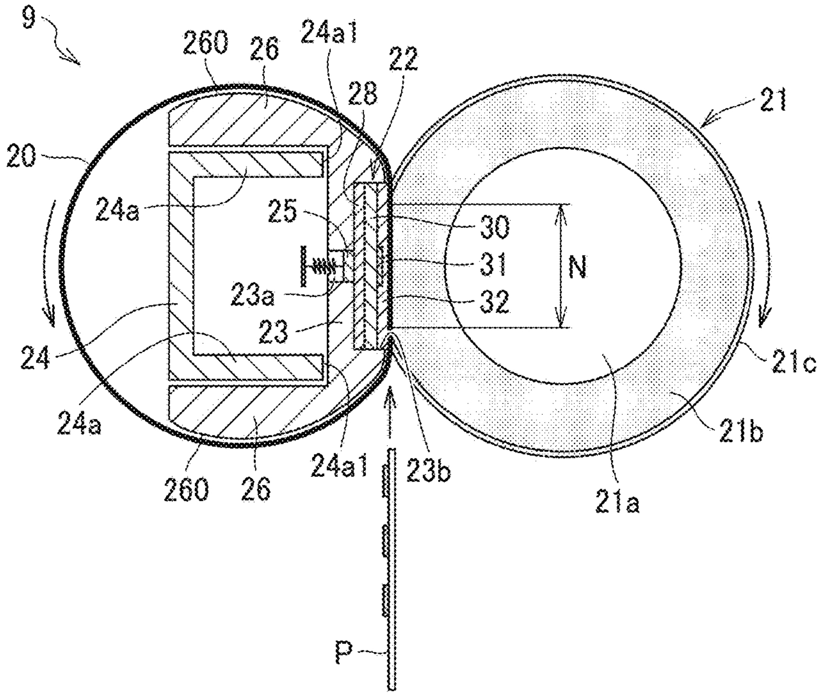
FIG. 11 is a side cross-sectional view of the fixing device including a first high thermal conductive member.

As illustrated in FIG. 11, the first high thermal conduction member 28 is disposed between the heater 22 and the stay 24 in the lateral direction of FIG. 11 and is in particular sandwiched between the heater 22 and the heater holder 23. One side of the first high thermal conduction member 28 is brought into contact with the back surface of the base 30, and the other side of the first high thermal conduction member 28 is brought into contact with the heater holder 23.

The stay 24 bring contact surfaces of two vertical portions 24*a* extending in the thickness direction of the heater 22 or the like into direct contact with the heater holder 23 to support the heater holder 23, the first high thermal conduction member 28, and the heater 22. In the direction intersecting the arrangement direction that is the vertical direction in FIG. 11, the contact surfaces are outside the resistive heat generators 31. The above-described structure prevents heat transfer from the heater 22 to the stay 24 and enables the heater 22 to effectively heat the fixing belt 20.

Figure 16:
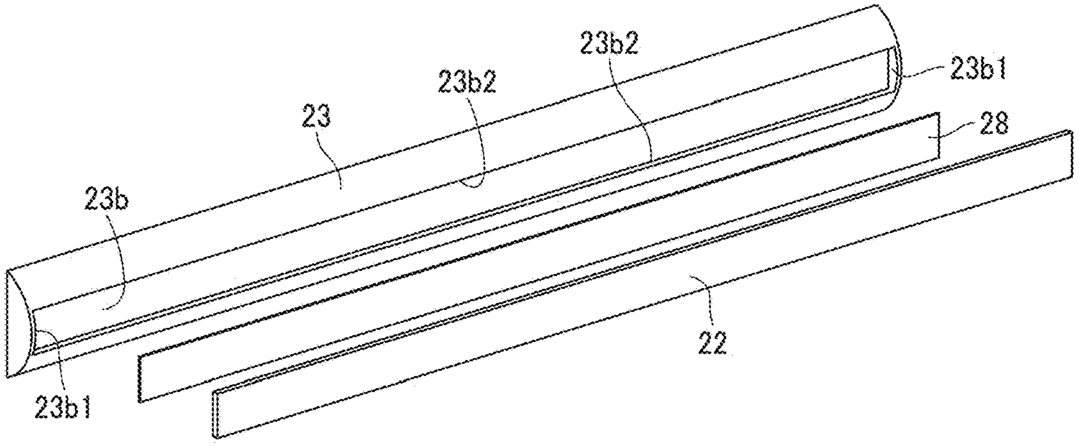
FIG. 16 is a perspective view of the heater, the first high thermal conductive member, and a heater holder.

As illustrated in FIG. 16, the first high thermal conduction member 28 is a plate having a thickness of 0 3 mm, a length of 222 mm in the arrangement direction, and a width of 10 mm in the direction intersecting the arrangement direction. In the present embodiment, the first high thermal conduction member 28 is made of a single plate but may be made of a plurality of members. FIG. 16 does not illustrate the guide ribs 26 of FIG. 11.

The first high thermal conduction member 28 is fitted into a recessed portion 23*b* of the heater holder 23, and the heater 22 is mounted thereon. Thus, the first high thermal conduction member 28 is sandwiched and held between the heater holder 23 and the heater 22. In the present embodiment, the length of the first high thermal conduction member 28 in the arrangement direction is substantially the same as the length of the heater 22 in the arrangement direction. Both side walls 23*b*1 forming the recessed portion 23*b* in the arrangement direction restrict movement of the heater 22 and movement of the first high thermal conduction member 28 in the arrangement direction and work as arrangement direction regulators. Reducing the positional deviation of the first high thermal conduction member 28 in the arrangement direction in the fixing device 9 improves the thermal conductivity efficiency with respect to a target range in the arrangement direction. In addition, both side walls 23*b*2 forming the recessed portion 23*b* in the direction intersecting the arrangement direction restricts movement of the heater 22 and movement of the first high thermal conduction member 28 in the direction intersecting the arrangement direction.

Figure 17:
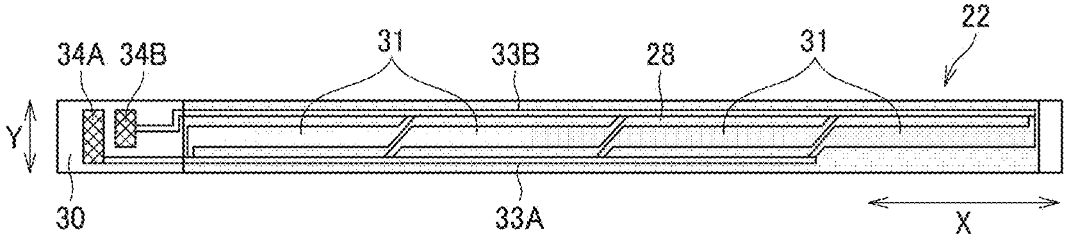
FIG. 17 is a plan view of the heater, which illustrates an arrangement of the first high thermal conductive member.
Figure 18:
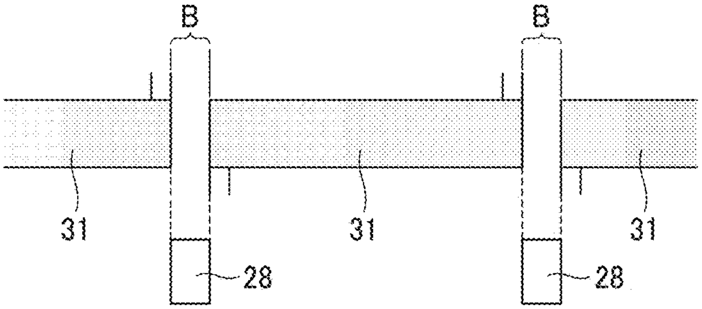
FIG. 18 is a plan view of the heater, which illustrates a different example of arrangement of the first high thermal conductive members.

The range in which the first high thermal conduction member 28 is arranged in the arrangement direction is not limited to the above. For example, as illustrated in FIG. 17, the first high thermal conduction member 28 may be disposed so as to face a range corresponding to the heat generation portion 35 in the arrangement direction (see a hatched portion in FIG. 17). As illustrated in FIG. 18, the first high thermal conduction member 28 may face the entire gap area between the resistive heat generators 31. In FIG. 18, for the sake of convenience, the resistive heat generator 31 and the first high thermal conduction member 28 are shifted in the vertical direction of FIG. 18 but are disposed at substantially the same position in the direction intersecting the arrangement direction. However, the present disclosure is not limited to the above. The first high thermal conduction member 28 may be disposed to face a part of the resistive heat generators 31 in the direction intersecting the arrangement direction or may be disposed so as to cover the entire resistive heat generators 31 in the direction intersecting the arrangement direction as illustrated in FIG. 19, which is described below.

Figure 19:
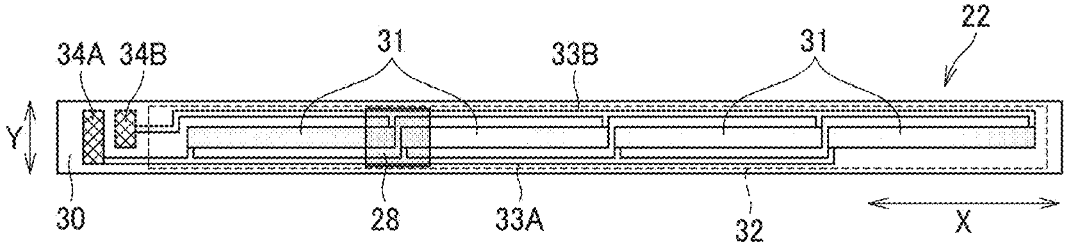
FIG. 19 is a plan view of the heater, which illustrates a further different example of arrangement of the first high thermal conductive members.

As illustrated in FIG. 19, the first high thermal conduction member 28 may be disposed at the position corresponding to the gap B in the arrangement direction, or may be disposed across the resistive heat generators 31 on both sides between which the gap B is interposed. Providing across the resistive heat generators 31 on both sides means that the first high thermal conduction member 28 at least partially overlaps the resistive heat generators 31 on both sides in the arrangement direction. The first high thermal conduction member 28 may be arranged to face all separation regions B in the heater 22, one separation region B as illustrated in FIG. 19, or some of separation regions B. Providing at a position corresponding to the gap B in the arrangement direction means that at least the first high thermal conduction member 28 at least partially overlaps the gap B in the arrangement direction.

Due to the pressing force of the pressure roller 21, the first high thermal conduction member 28 is sandwiched between the heater 22 and the heater holder 23 and is brought into close contact with the heater 22 and the heater holder 23. Bringing the first high thermal conduction member 28 into contact with the heaters 22 improves the heat conduction efficiency of the heaters 22 in the arrangement direction. The first high thermal conduction member 28 is disposed at the position corresponding to the gap B in the heaters 22 in the arrangement direction, so that the thermal conduction efficiency at the gap B can be improved. As a result, the amount of heat transferred to the region of the gap B in the arrangement direction can be increased, and the temperature in the region of the gap B in the arrangement direction can be increased. As a result, the first high thermal conduction member 28 reduces the temperature unevenness in the arrangement direction of the heaters 22. Thus, temperature unevenness in the arrangement direction of the fixing belt 20 is reduced. Therefore, the above-described structure prevents fixing unevenness and gloss unevenness in the image fixed on the sheet. Since the heater 22 does not need to generate additional heat to secure sufficient fixing performance in the part of the heater 22 facing the separation region B, energy consumption of the fixing device 9 can be saved. The first high thermal conduction member 28 arranged over the entire area of the heat generation portion 35 in the arrangement direction improves the heat transfer efficiency of the heater 22 over the entire area of a main heating region of the heater 22 (that is, an area facing an image formation area of the sheet passed through the fixing device) and reduces the temperature unevenness of the heater 22 and the temperature unevenness of the fixing belt 20 in the arrangement direction.

In the present embodiment, the combination of the first high thermal conduction member 28 and the resistive heat generator 31 having the PTC characteristic described above efficiently prevents overheating the non-sheet passage region (that is the region of the fixing belt outside the small sheet) of the fixing belt 20 when small sheets pass through the fixing device 9. Specifically, the PTC characteristic reduces the amount of heat generated by the resistive heat generator 31 in the non-sheet passage region, and the first high thermal conduction member 28 effectively transfers heat from the non-sheet passage region in which the temperature rises to a sheet passage region that is a region of the fixing belt contacting the sheet. As a result, the overheating of the non-sheet passage region is effectively prevented.

The first high thermal conduction member 28 may be arranged opposite an area around the gap B because the small heat generation amount in the gap B decreases the temperature in the area around the gap B. For example, the first high thermal conduction member 28 facing the enlarged separation area C (see FIG. 13) in particular improves the heat transfer efficiency of the gap B and the area around the gap B in the arrangement direction and reduces the temperature unevenness of the heater 22 in the arrangement direction. In particular, in the present embodiment, the first high thermal conduction member 28 is disposed over the entire area of the heat generation portion 35 in the arrangement direction. As a result, temperature unevenness in the arrangement direction of the heater 22 (fixing belt 20) can be further suppressed.

Next, different embodiments of the fixing device are described.

Figure 20:
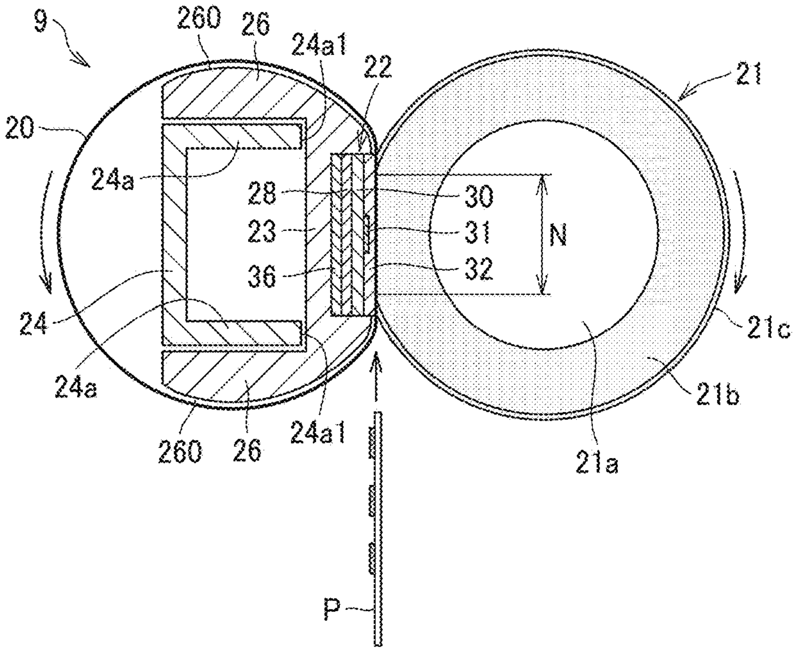
FIG. 20 is a schematic side cross-sectional view of a fixing device in an embodiment different from that in FIG. 2.

As illustrated in FIG. 20, the fixing device 9 according to the present embodiment includes a second high thermal conduction member 36 between the heater holder 23 and the first high thermal conduction member 28. The second high thermal conduction member 36 is arranged at a position different from the position of the first high thermal conduction member 28 in the lateral direction in FIG. 20 that is a direction in which the heater holder 23, the stay 24, and the first high thermal conduction member 28 are layered. Specifically, the second high thermal conduction member 36 is arranged so as to overlap the first high thermal conduction member 28. FIG. 20 illustrates a schematic cross section of the fixing device 9 including the second high thermal conduction member 36 that transmits heat in the arrangement direction, and the position of the schematic cross section is different from the position of the thermistor 25 illustrated in FIG. 11. That is, FIG. 20 illustrates a cross section in which the second high thermal conduction member 36 is arranged.

The second high thermal conduction member 36 is made of a material having thermal conductivity higher than the thermal conductivity of the base 30, for example, graphene or graphite. In the present embodiment, the second high thermal conduction member 36 is made of a graphite sheet having a thickness of 1 mm. Alternatively, the second high thermal conduction member 36 may be a plate made of aluminum, copper, silver, or the like.

Figure 21:
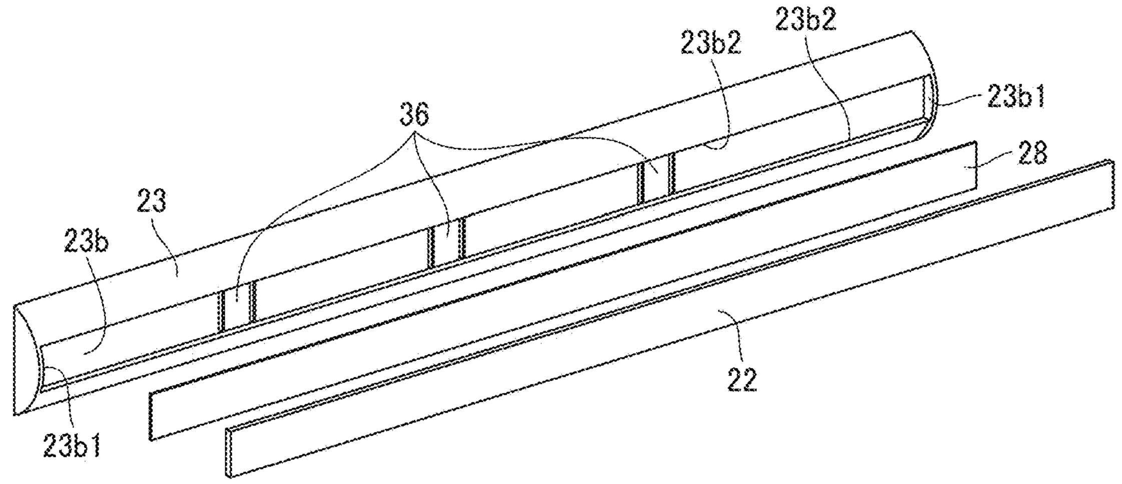
FIG. 21 is a perspective view of a heater, a first high thermal conductive member, a second high thermal conductive member, and a heater holder.

As illustrated in FIG. 21, a plurality of the second high thermal conduction members 36 is disposed on a plurality of portions of the heater holder 23 in the arrangement direction. The recessed portion 23*b* of the heater holder 23 has a plurality of holes in which the second high thermal conduction members 36 are arranged. Clearances are formed between the heater holder 23 and both sides of the second high thermal conduction member 36 in the arrangement direction. The clearance prevents heat transfer from the second high thermal conduction member 36 to the heater holder 23, and the heater 22 can efficiently heat the fixing belt 20. FIG. 21 does not illustrate the guide ribs 26 of FIG. 11.

Figure 22:
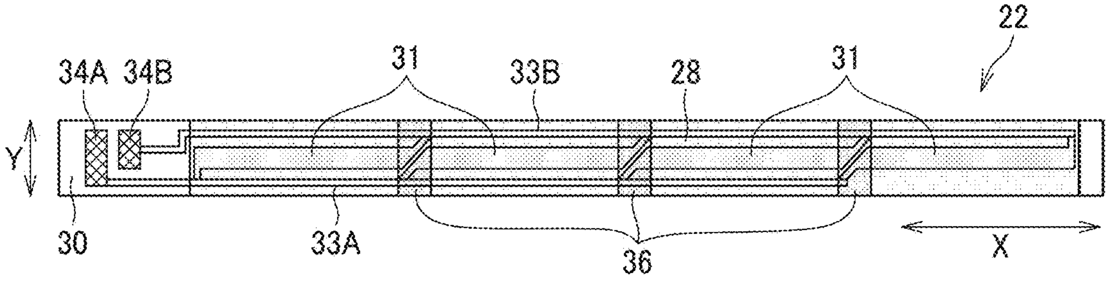
FIG. 22 is a plan view of the heater, which illustrates an arrangement of the first high thermal conductive member and the second high thermal conductive member.
Figure 26:
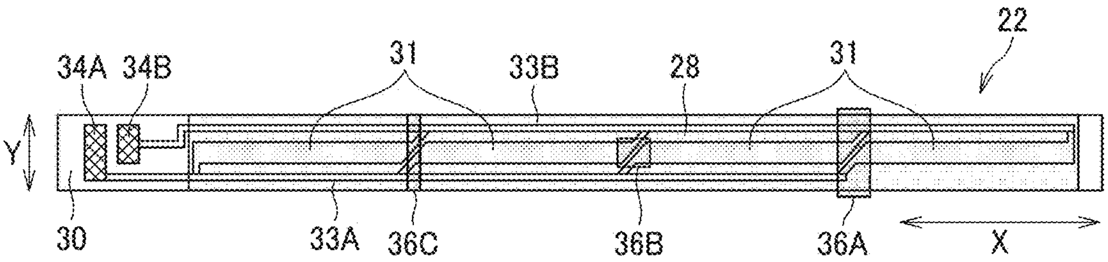
FIG. 26 is a plan view of a heater in which an arrangement of second high thermal conductive members is different from that in FIG. 22.

As illustrated in FIG. 22, each of the second high thermal conduction members 36 (see the hatched portions) is disposed at a position corresponding to the separation area B in the arrangement direction and faces at least a part of each of the neighboring resistive heat generators 31 in the arrangement direction. In particular, each of the second high thermal conduction members 36 in the present embodiment faces the entire separation area B. In FIG. 22 and FIG. 26 to be described later, the first high thermal conduction member 28 faces the heat generation portion 35 extending in the arrangement direction, but the first high thermal conduction member 28 according to the present embodiment is not limited this as described above.

Figure 23:
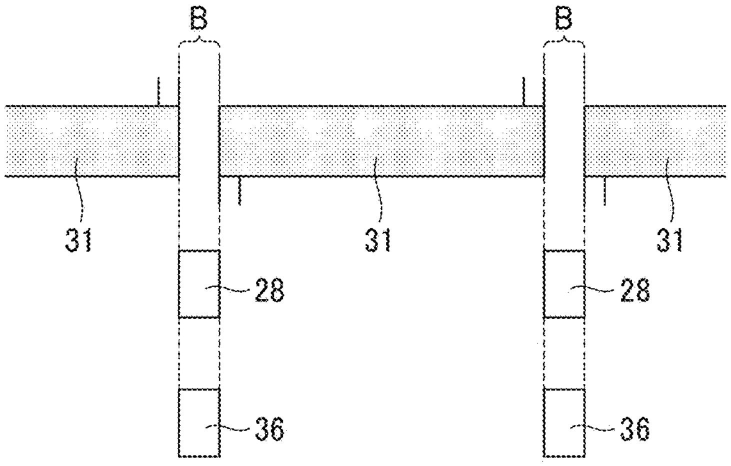
FIG. 23 is a plan view of the heater, which illustrates a different example of arrangement of the first high thermal conductive members and the second high thermal conductive members.

The fixing device 9 according to the present embodiment includes the second high thermal conduction member 36 arranged at the position corresponding to the separation region B in the arrangement direction and the position at which at least a part of each of the neighboring resistive heat generators 31 faces the second high thermal conduction member 36 in addition to the first high thermal conduction member 28. The above-described structure in particular improves the heat transfer efficiency in the separation region B in the arrangement direction and further reduces the temperature unevenness of the heater 22 in the arrangement direction. As illustrated in FIG. 23, most preferably, the first high thermal conduction members 28 and the second high thermal conduction member 36 may be disposed opposite the entire gap area between the resistive heat generators 31. The above-described structure improves the heat transfer efficiency of the part of the heater 22 corresponding to the gap area to be higher than the heat transfer efficiency of the other part of the heater 22. In FIG. 23, for the sake of convenience, the resistive heat generator 31, the first high thermal conduction member 28, and the second high thermal conduction member 36 are shifted in the vertical direction of FIG. 23 but are disposed at substantially the same position in the direction intersecting the arrangement direction. The present disclosure is not limited to the above. The first high thermal conduction member 28 and the second high thermal conduction member 36 may be arranged opposite a part of the resistive heat generators 31 in the direction intersecting the arrangement direction.

In one embodiment different from the embodiments described above, each of the first high thermal conduction member 28 and the second high thermal conduction member 36 is made of a graphene sheet. The first high thermal conduction member 28 and the second high thermal conduction member 36 made of the graphene sheet have high thermal conductivity in a predetermined direction along the plane of the graphene, that is, not in the thickness direction but in the arrangement direction. Accordingly, the above-described structure can effectively reduce the temperature unevenness of the fixing belt 20 in the arrangement direction and the temperature unevenness of the heater 22 in the arrangement direction.

Figure 24:
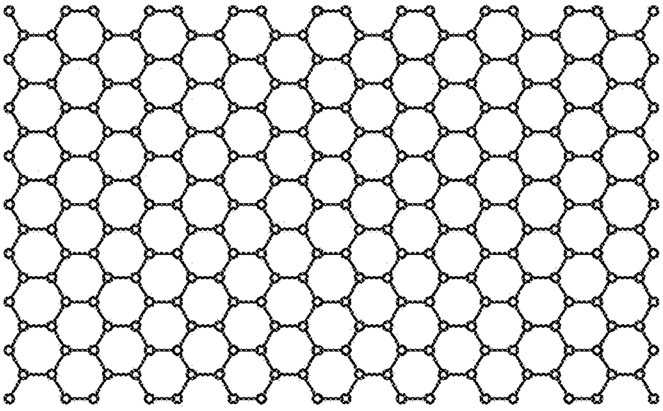
FIG. 24 is a diagram illustrating an atomic crystal structure of graphene.

Graphene is a flaky powder. Graphene has a planar hexagonal lattice structure of carbon atoms, as illustrated in FIG. 24. The graphene sheet is usually a single layer. The single layer of carbon may contain impurities. The graphene may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described later are measured by, for example, a transmission electron microscope (TEM).

Figure 25:
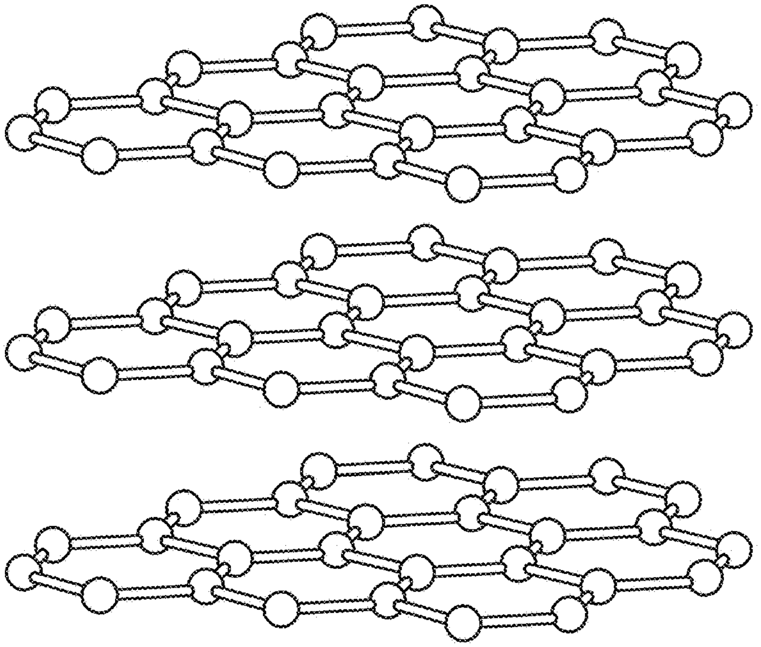
FIG. 25 is a diagram illustrating an atomic crystal structure of graphite.

Graphite obtained by multilayering graphene has a large thermal conduction anisotropy. As illustrated in FIG. 25, graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. That is, the first high thermal conduction member 28 and the second high thermal conduction member 36 that are made of graphite each have the heat transfer efficiency in the arrangement direction larger than the heat transfer efficiency in the thickness direction of the first high thermal conduction member 28 and the second high thermal conduction member 36 (that is, the stacking direction of these members), reducing the heat transferred to the heater holder 23. Accordingly, the above-described structure can efficiently decrease the temperature unevenness of the heater 22 in the arrangement direction and can minimize the heat transferred to the heater holder 23. Since the first high thermal conduction member 28 and the second high thermal conduction member 36 that are made of graphite are not oxidized at about 700 degrees or lower, the first high thermal conduction member 28 and the second high thermal conduction member 36 each have an excellent heat resistance.

The physical properties and dimensions of the graphite sheet may be appropriately changed according to the function required for the first high thermal conduction member 28 or the second high thermal conduction member 36. For example, the anisotropy of the thermal conduction can be increased by using high-purity graphite or single-crystal graphite or increasing the thickness of the graphite sheet. Using a thin graphite sheet can reduce the thermal capacity of the fixing device 9 so that the fixing device 9 can perform high speed printing. A width of the first high thermal conduction member 28 or a width of the second high thermal conduction member 36 in the direction intersecting the arrangement direction may be increased in response to a large width of the fixing nip N or a large width of the heater 22.

From the viewpoint of increasing mechanical strength, the number of layers of the graphite sheet is preferably 11 or more. The graphite sheet may partially include a single layer portion and a multilayer portion.

As long as the second high thermal conduction member 36 faces a part of each of neighboring resistive heat generators 31 and at least a part of the gap area between the neighboring resistive heat generators 31, the configuration of the second high thermal conduction member 36 is not limited to the configuration illustrated in FIG. 22. For example, as illustrated in FIG. 26, a second high thermal conduction member 36A is longer than the base 30 in the direction intersecting the arrangement direction, and both ends of the second high thermal conduction member 36A in the direction intersecting the arrangement direction are outside the base 30 in FIG. 28. A second high thermal conduction member 36B faces a range in which the resistive heat generator 31 is arranged in the direction intersecting the arrangement direction. A second high thermal conduction member 36C faces a part of the gap area and a part of each of neighboring resistive heat generators 31.

Figure 27:
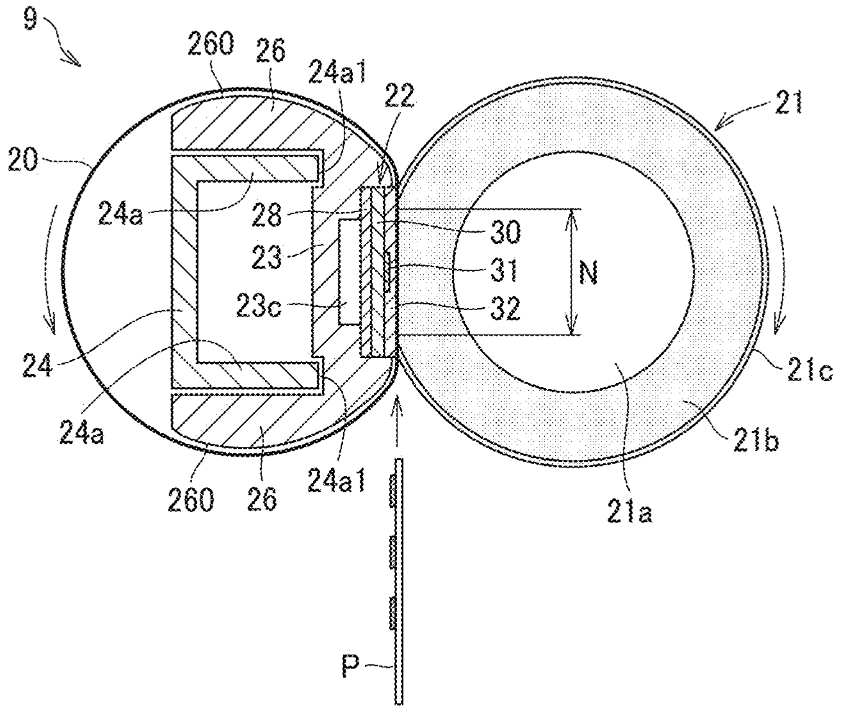
FIG. 27 is a schematic side cross-sectional view of a fixing device in an embodiment different from those in FIGS. 2 and 20.

As illustrated in FIG. 27, the fixing device according to the present embodiment has a gap between the first high thermal conduction member 28 and the heater holder 23 in the thickness direction that is the lateral direction in FIG. 27. That is, in a partial region of the recessed portion 23*b* (see FIG. 21) for arranging the heater 22, the first high thermal conduction member 28, and the second high thermal conduction member 36 of the heater holder 23, an escape portion 23*c* as a heat insulating layer is provided so that the depth of the recessed portion 23*b* is deeper than the other portion receiving the first high thermal conduction member 28. This partial region is a partial region seen along the array crossing direction, which is a part or the whole of a region other than the region where the second high thermal conduction member 36 is disposed in the array direction. The above-described structure minimizes the contact area between the heater holder 23 and the first high thermal conduction member 28. Minimizing the contact area prevents heat transfer from the first high thermal conduction member 28 to the heater holder 23 and enables the heater 22 to efficiently heat the fixing belt 20. In the cross section of the fixing device 9 in which the second high thermal conduction member 36 is set, the second high thermal conduction member 36 is in contact with the heater holder 23 as illustrated in FIG. 20 of the above-described embodiment.

In particular, the fixing device 9 according to the present embodiment has the gap 23*c* facing the entire area of the resistive heat generators 31 in the direction intersecting the arrangement direction that is the vertical direction in FIG. 27. The gap 23*c* prevents heat transfer from the first high thermal conduction member 28 to the heater holder 23, and the heater 22 can efficiently heat the fixing belt 20. The fixing device 9 may include a thermal insulation layer made of heat insulator having a lower thermal conductivity than the thermal conductivity of the heater holder 23 instead of a space like the gap 23*c* serving as the thermal insulation layer.

In the above description, the second high thermal conduction member 36 is a member different from the first high thermal conduction member 28, but the present embodiment is not limited to this. For example, the first high thermal conduction member 28 may have a thicker portion than the other portion so that the thicker portion faces the separation region B.

Figure 28:
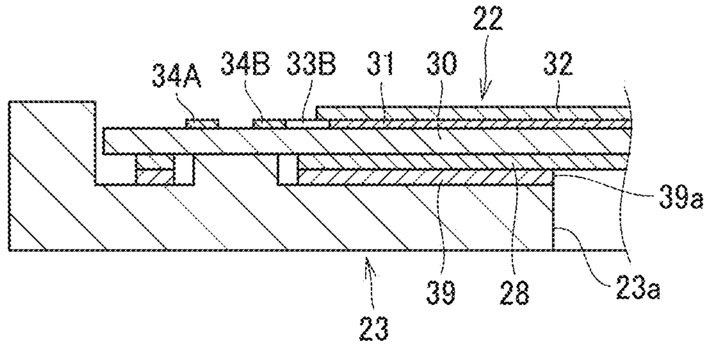
FIG. 28 is a partial cross-sectional view of the fixing device in which the first high thermal conductive member is disposed between the heat insulating member and the heater.

As illustrated in FIG. 28, a heat insulating member 39 may be disposed between the first high thermal conduction member 28 and the heater holder 23. Referring to FIG. 28, the thermistor 25 is in contact with the first high thermal conduction member 28 with the opening 23*a* of the heater holder 23 and the opening 39*a* of the heat insulating member 39 in between.

Also in the embodiment of FIG. 20, 27, or 28 described above, similarly to the above-described embodiments, the anomalies caused by the problems 1 to 3 can be detected and solved by arranging the end-side thermistor 25A and the center-side thermistor 25B and bringing into contact with the first high thermal conduction member 28 or the second high thermal conduction member 36, or by arranging the sheet passage detection sensor 29. That is, the end-side thermistor 25A, the center-side thermistor 25B, and the sheet passage detection sensor 29 can detect an error in the size of the sheet or an error in the setting position and prevent a temperature rise in the end portion of the fixing belt 20. In addition, a temperature drop at the end portion can be detected by the end-side thermistor 25A. Therefore, it is possible to prevent the rotator from being damaged due to an increase in the temperature of the end portion at low cost and to suppress a temperature drop in the end portion of the rotator.

The above-described embodiments are illustrative and do not limit this disclosure. It is therefore to be understood that within the scope of the appended claims, numerous additional modifications and variations are possible to this disclosure otherwise than as specifically described herein.

Figure 29:
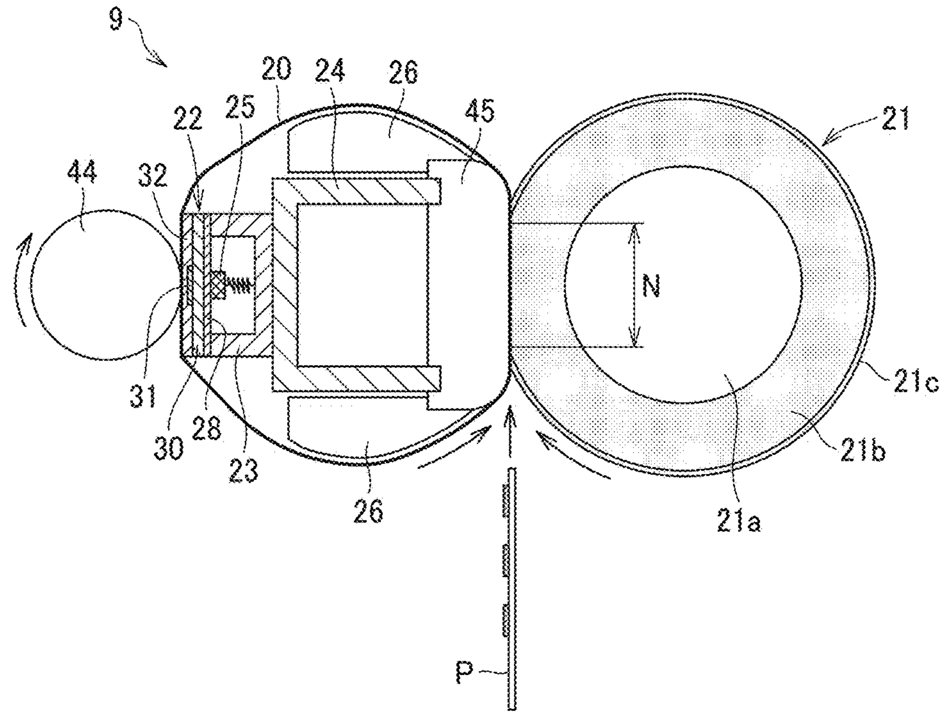
FIG. 29 is a schematic side cross-sectional view of a fixing device different from the above ones.
Figure 30:
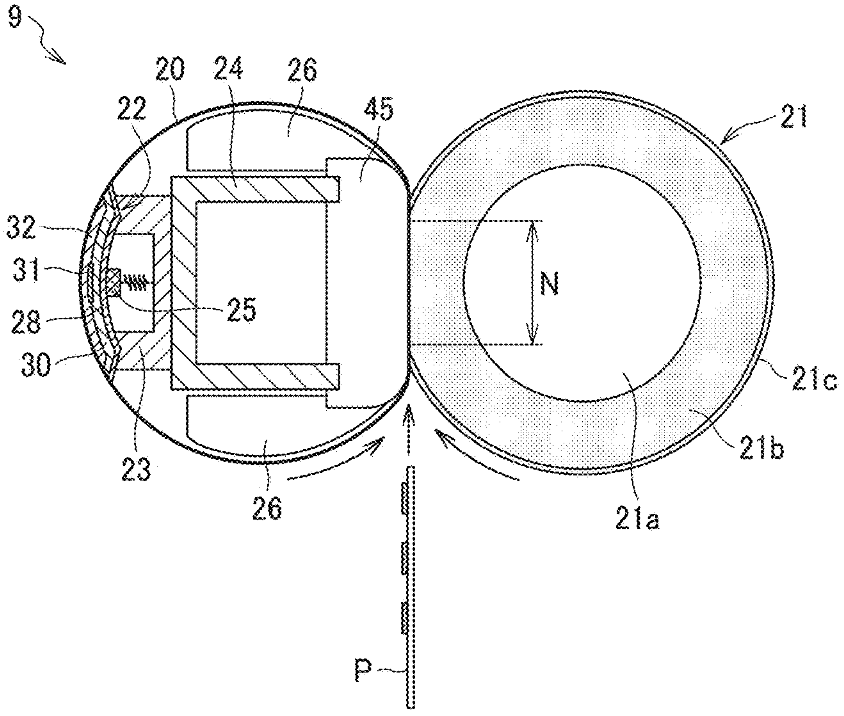
FIG. 30 is a schematic side cross-sectional view of a fixing device different from the above ones.
Figure 31:
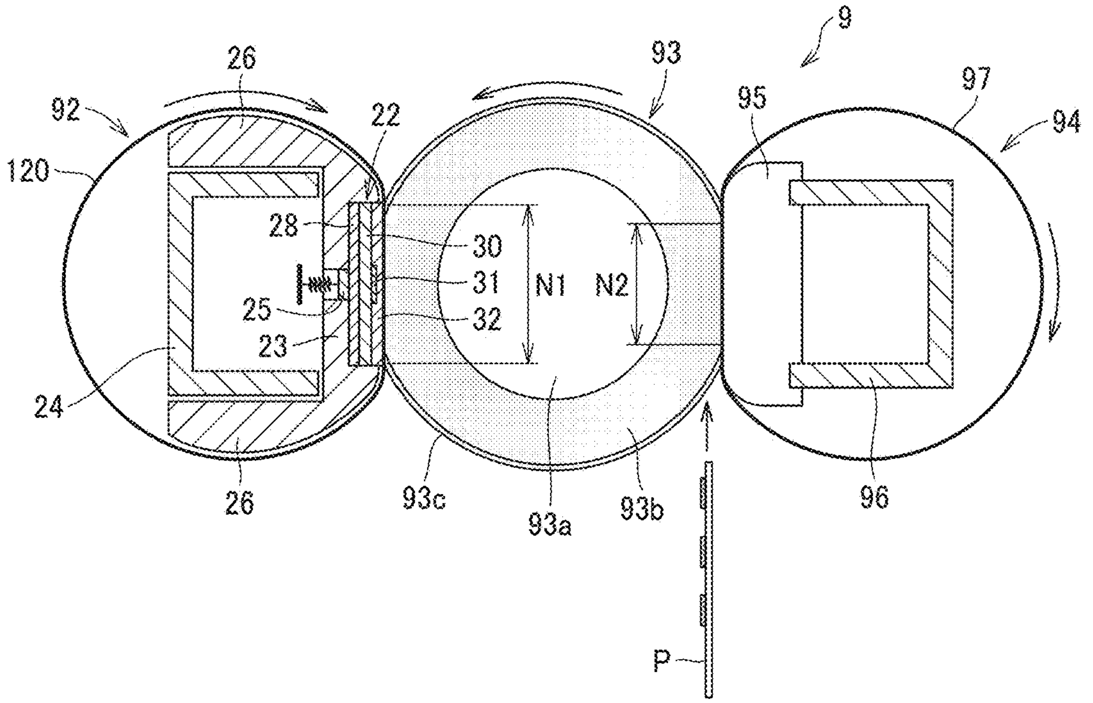
FIG. 31 is a schematic side cross-sectional view of a fixing device different from the above ones.

The embodiments of the present disclosure are also applicable to fixing devices as illustrated in FIGS. 29 to 31, respectively, other than the fixing device 9 described above. The following briefly describes a construction of each of the fixing devices 9S, 9T, and 9U depicted in FIGS. 29 to 31, respectively.

First, the fixing device 9 illustrated in FIG. 29 includes a pressurization roller 84 opposite the pressure roller 21 with respect to the fixing belt 20. The pressurization roller 84 is an opposed rotator that rotates and is opposite the fixing belt 20 as the rotator. The fixing belt 20 is sandwiched by the pressurization roller 84 and the heater 22 and heated by the heater 22. On the other hand, a nip formation pad 45 serving as a nip former is arranged inside the loop formed by the fixing belt 20 and arranged opposite the pressure roller 21. The nip formation pad 45 is supported by the stay 24. The nip formation pad 45 sandwiches the fixing belt 20 together with the pressure roller 21, thereby forming the fixing nip N.

A description is provided of the construction of the fixing device 9 as illustrated in FIG. 30. The fixing device 9 does not include the pressurization roller 84 described above with reference to FIG. 30. In order to attain a contact length for which the heater 22 contacts the fixing belt 20 in the circumferential direction thereof, the heater 22 is curved into an arc in cross section that corresponds to a curvature of the fixing belt 20. Other construction of the fixing device 9T is equivalent to that of the fixing device 9S depicted in FIG. 29.

Finally, the fixing device 9 illustrated in FIG. 31 is described. The fixing device 9 includes a heating assembly 92, a fixing roller 93 that is a fixing member, and a pressure assembly 94 that is a facing member. The heating assembly 92 includes the heater 22, the first high thermal conduction member 28, the heater holder 23, the stay 24, which are described in the above embodiments, and a heating belt 120 as the rotator. The fixing roller 93 is an opposed rotator that rotates and faces the heating belt 120 as the rotator. The fixing roller 93 includes a core 93*a*, an elastic layer 93*b*, and a release layer 93*c*. The core 93*a* is a solid core made of iron. The elastic layer 93*b* coats the circumferential surface of the core 93*a*. The release layer 93*c* coats an outer circumferential surface of the elastic layer 93*b*. The pressure assembly 94 is opposite to the heating assembly 92 with respect to the fixing roller 93. The pressure assembly 94 includes a nip formation pad 95 and a stay 96 inside the loop of a pressure belt 97, and the pressure belt 97 is rotatably arranged to wrap around the nip formation pad 95 and the stay 96. The sheet P passes through the fixing nip N2 between the pressure belt 97 and the fixing roller 93 to be heated and pressed to fix the image onto the sheet P. An arrow J in FIG. 31 indicates a rotation direction of the pressure belt 97.

Also in the fixing device of FIGS. 29 to 31, the anomalies caused by the problems 1 to 3 can be detected and solved by arranging the end-side thermistor 25A, the center-side thermistor 25B, and the sheet passage detection sensor 29. That is, the end-side thermistor 25A, the center-side thermistor 25B, and the sheet passage detection sensor 29 can detect an error in the size of the sheet or an error in the setting position and prevent a temperature rise in the end portion of the fixing belt 20. In addition, a temperature drop at the end portion can be detected by the end-side thermistor 25A. Therefore, it is possible to prevent the rotator from being damaged due to an increase in the temperature of the end portion at low cost and to suppress a temperature drop in the end portion of the rotator.

Further, the heating device disposed in the conveyance device of the present disclosure and including the first temperature detector and the second temperature detector is not limited to the fixing devices described in the above embodiments. That is, the heating device may be a drying device that dries ink applied to a sheet, or a heating device such as a laminator that thermally compresses and bonds a film as a covering member to a surface of a sheet such as a paper sheet, or a thermocompression bonding device such as a heat sealer that thermally compresses and bonds a sealing portion of a packaging material. Applying the present disclosure to a conveyance device including such a heating device makes it possible to prevent the rotator from being damaged due to an increase in the temperature of the end portion at low cost and to suppress a temperature drop in the end portion of the rotator.

An image forming apparatus according to an embodiment of the present disclosure is not limited to a color image forming apparatus as illustrated in FIG. 1 but may be, for example, a monochrome image forming apparatus, a copier, a printer, a facsimile machine, or a multifunction peripheral including at least two functions of the copier, printer, and facsimile machine.

Figure 32:
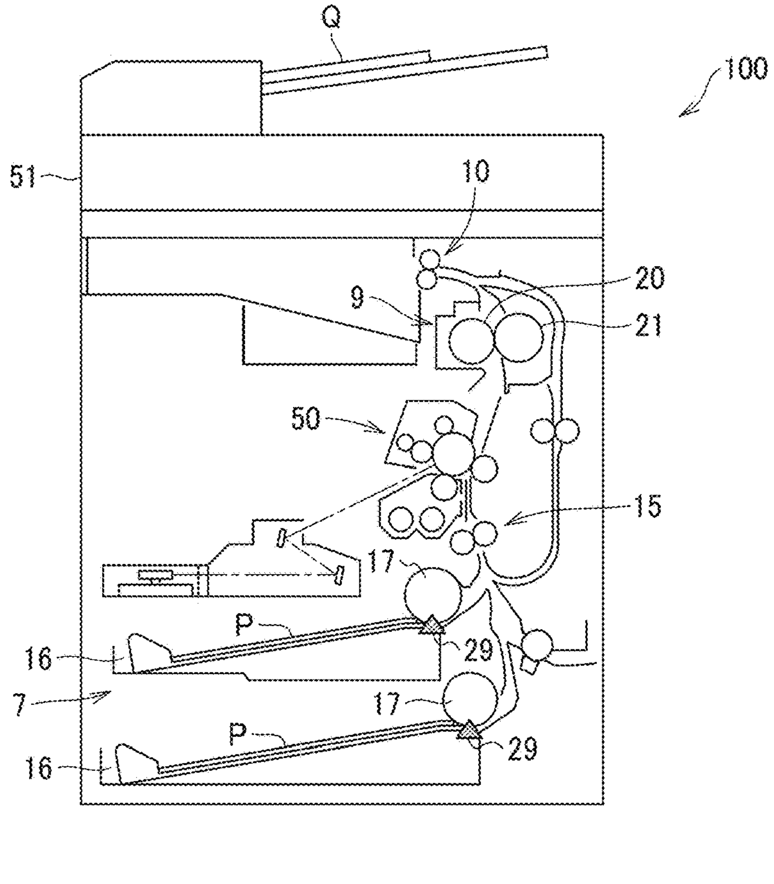
FIG. 32 is a schematic configuration diagram of an image forming apparatus different from that in FIG. 1.

For example, as illustrated in FIG. 32, the image forming apparatus 100 according to the present embodiment includes an image forming device 50 including a photoconductor drum and the like, the sheet conveyer including the timing roller pair 15 and the like, the sheet feeding device 7, the fixing device 9, the sheet ejection device 10, and a reading device 51. The sheet feeding device 7 includes a plurality of sheet feeding trays 16 and corresponding sheet passage detection sensors 29 and sheet feeding rollers 17, and the sheet feeding trays 16 store sheets of different sizes.

In the present embodiment, the sheet passage detection sensors 29 are disposed in the sheet feeding trays 16, but may be disposed in the vicinity of the timing roller pair 15 upstream on the conveyance path.

The reading device 51 reads an image of a document Q. The reading device 51 generates image data from the read image. The sheet feeding device 7 stores the plurality of sheets P and feeds the sheet P to the conveyance path. The timing roller pair 15 conveys the sheet P on the conveyance path to the image forming device 50.

The image forming device 50 forms a toner image on the sheet P. Specifically, the image forming device 50 includes the photoconductor drum, a charging roller, the exposure device, the developing device, a supply device, a transfer roller, the cleaning device, and a discharging device. The toner image is, for example, an image of the document Q. The fixing device 9 heats and presses the toner image to fix the toner image on the sheet P. Conveyance rollers convey the sheet P on which the toner image has been fixed to the sheet ejection device 10. The sheet ejection device 10 ejects the sheet P to the outside of the image forming apparatus 100.

Next, the fixing device 9 of the present embodiment is described. Description of configurations common to those of the fixing devices of the above-described embodiments is omitted as appropriate.

Figure 33:
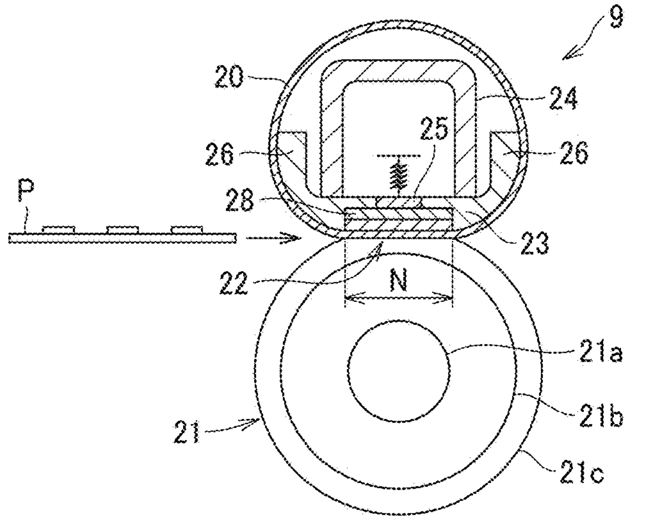
FIG. 33 is a schematic side cross-sectional view of a fixing device according to an embodiment of the present disclosure.

As illustrated in FIG. 33, the fixing device 9 includes the fixing belt 20, the pressure roller 21, the heater 22, the heater holder 23, the stay 24, the thermistors 25, and the first high thermal conduction member 28.

The fixing nip N is formed between the fixing belt 20 and the pressure roller 21. The nip width of the fixing nip N is 10 mm, and the linear velocity of the fixing device 9 is 240 mm/s.

The fixing belt 20 includes a polyimide base and the release layer and does not include the elastic layer. The release layer is made of a heat-resistant film material made of, for example, fluororesin. The outer loop diameter of the fixing belt 20 is about 24 mm.

The pressure roller 21 includes the core 21*a*, the elastic layer 21*b*, and the release layer 21*c*. The pressure roller 21 has an outer diameter of 24 to 30 mm, and the elastic layer 21*b* has a thickness of 3 to 4 mm.

The heater 22 includes the base, the thermal insulation layer, the conductor layer including the resistive heat generator and the like, and the insulation layer, and is formed to have a thickness of 1 mm as a whole. A width Y of the heater 22 in the direction intersecting the arrangement direction is 13 mm.

Figure 34:
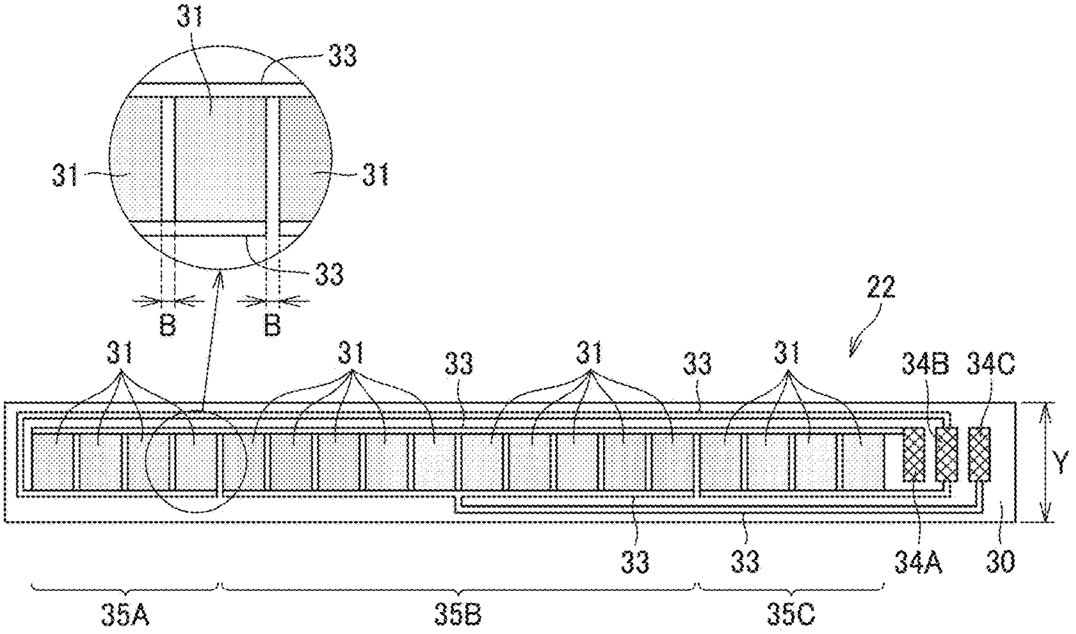
FIG. 34 is a plan view of a heater in the fixing device in FIG. 33.

As illustrated in FIG. 34, the conductor layer of the heater 22 includes a plurality of resistive heat generators 31, power supply lines 33, and electrodes 34A to 34C. As illustrated in the enlarged view of FIG. 34, the separation area B is formed between neighboring resistive heat generators of the plurality of resistive heat generators 31 arranged in the arrangement direction. The enlarged view of FIG. 34 illustrates two separation areas B, but the separation area B is formed between neighboring resistive heat generators of all the plurality of resistive heat generators 31. The resistive heat generators 31 configure three heat generation portions 35A to 35C. When a current flows between the electrodes 34A and 34B, the heat generation portions 35A and 35C generate heat. When a current flows between the electrodes 34A and 34C, the heat generation portion 35B generates heat. When the fixing device 9 fixes the toner image onto the small sheet, the heat generation portion 35B generates heat. When the fixing device 9 fixes the toner image onto the large sheet, all the heat generation portions 35A to 35C generate heat.

Figure 35:
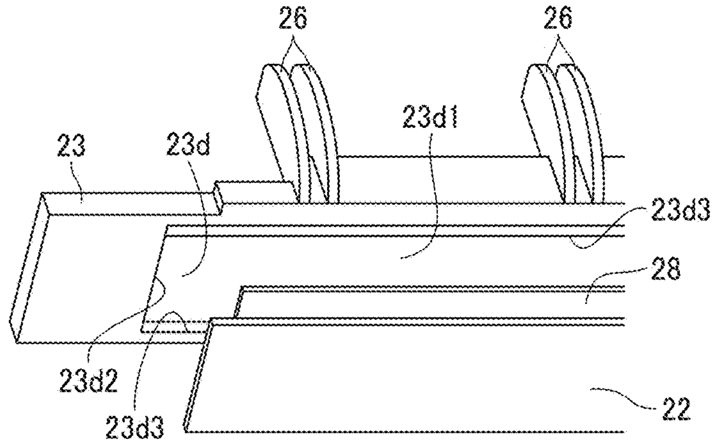
FIG. 35 is a perspective view of a heater and a heater holder.

As illustrated in FIG. 35, the heater holder 23 holds the heater 22 and the first high thermal conduction member 28 in a recessed portion 23*d*. The recessed portion 23*d* is formed on the side of the heater holder 23 facing the heater 22. The recessed portion 23*d* has a bottom surface 23*dl* and walls 23*d*2 and 23*d*3. The bottom surface 23*dl* is substantially parallel to the base 30 and the surface recessed from the side of the heater holder 23 toward the stay 24. The walls 23*d*2 are both side surfaces of the recessed portion 23*d* in the arrangement direction. The recessed portion 23*d* may have one wall 23*d*2. The walls 23*d*3 are both side surfaces of the recessed portion 23*d* in the direction intersecting the arrangement direction. The heater holder 23 includes guide ribs 26. The heater holder 23 is made of LCP.

Figure 36:
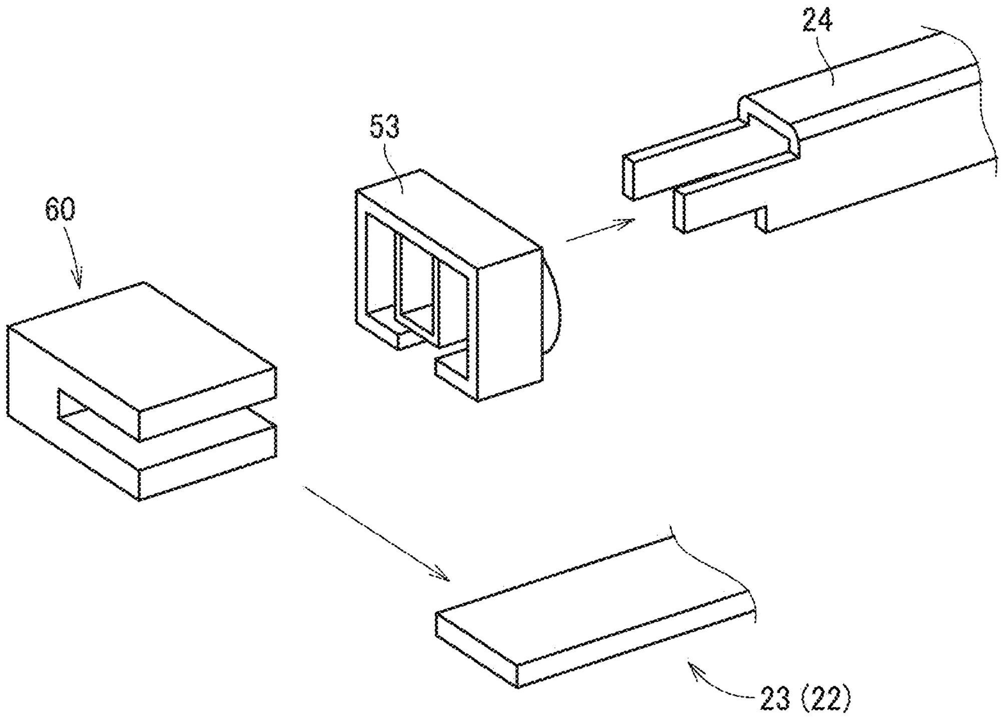
FIG. 36 is a perspective diagram illustrating a state in which the connector is attached to the heater.

As illustrated in FIG. 36, a connector 60 includes a housing made of resin such as LCP and a plurality of contact terminals fixed to the housing.

The connector 60 is attached to the heater 22 and the heater holder 23 such that a front side of the heater 22 and the heater holder 23 and a back side of the heater 22 and the heater holder 23 are sandwiched by the connector 60. In this state, the contact terminals contact and press against the electrodes of the heater 22, respectively and the heat generation portions 35 are electrically coupled to the power supply disposed in the image forming apparatus via the connector 60. The above-described configuration enables the power supply to supply power to the heat generation portions 35. Note that at least a part of each of the electrodes 34A to 34C is not coated by the insulation layer and therefore exposed to secure connection with the connector 60.

A flange 53 contacts the inner circumferential surface of the fixing belt 20 at each of both ends of the fixing belt 20 in the arrangement direction to hold the fixing belt 20. The flange 53 is fixed to the housing of the fixing device 9. The flange 53 is inserted into each of both ends of the stay 24 (see an arrow direction from the flange 53 in FIG. 36).

To attach to the heater 22 and the heater holder 23, the connector 60 is moved in the direction intersecting the arrangement direction (see a direction indicated by arrow from the connector 60 in FIG. 36). The connector 60 and the heater holder 23 may have a convex portion and a recessed portion to attach the connector 60 to the heater holder 23. The convex portion arranged on one of the connector 60 and the heater holder 23 is engaged with the recessed portion arranged on the other and relatively move in the recessed portion to attach the connector 60 to the heater holder 23. The connector 60 is attached to one end of the heater 22 and one end of the heater holder 23 in the arrangement direction. The one end of the heater 22 and the one end of the heater holder 23 are farther from a portion in which the pressure roller 21 receives a driving force from a drive motor than the other end of the heater 22 and the other end of the heater holder 23, respectively.

Figure 37:
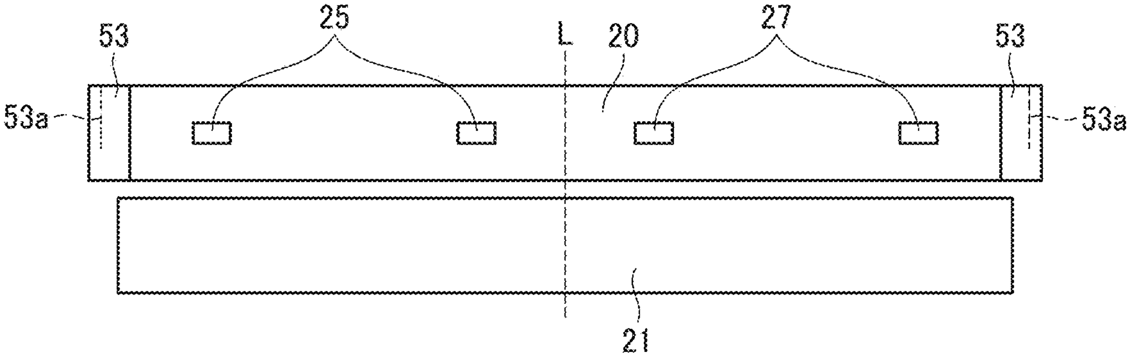
FIG. 37 is a diagram illustrating an arrangement of a thermistor and a thermostat.

As illustrated in FIG. 37, one thermistor 25 faces a center portion of the inner circumferential surface of the fixing belt 20 in the arrangement direction, and another thermistor 25 faces an end portion of the inner circumferential surface of the fixing belt 20 in the arrangement direction. The heater 22 is controlled based on the temperature of the center portion of the fixing belt 20 and the temperature of the end portion of the fixing belt 20 in the arrangement direction that are detected by the thermistors 25.

Figure 38:
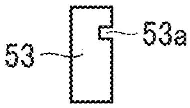
FIG. 38 is a diagram illustrating a groove portion of a flange.

As illustrated in FIG. 38, one thermostat 27 faces a center portion of the inner circumferential surface of the fixing belt 20 in the arrangement direction, and another thermostat 27 faces an end portion of the inner circumferential surface of the fixing belt 20 in the arrangement direction. Each of the thermostats 27 shuts off a current to the heater 22 in response to a detection of a temperature of the fixing belt 20 higher than a predetermined threshold value.

Flanges 53 are arranged at both ends of the fixing belt 20 in the arrangement direction and hold both ends of the fixing belt 20, respectively. The flange 53 is made of LCP.

As illustrated in FIG. 38, the flange 53 has a slide groove 53*a*. The slide groove 53*a* extends in a direction in which the fixing belt 20 moves toward and away from the pressure roller 21. An engaging portion of the housing of the fixing device 9 is engaged with the slide groove 53*a*. The relative movement of the engaging portion in the slide groove 53*a* enables the fixing belt 20 to move toward and away from the pressure roller 21.

Also in the fixing device 9 described above, similarly to the above-described embodiment, the anomaly caused by the problem 1 to 3 can be detected and solved by disposing the portion side thermistor 25A and the center side thermistor 25B to be brought into contact with the first high thermal conduction member 28 or the second high thermal conduction member 36 and disposing the sheet passage detection sensor 29. That is, the end-side thermistor 25A, the center-side thermistor 25B, and the sheet passage detection sensor 29 can detect an error in the size of the sheet or an error in the setting position and prevent a temperature rise in the end portion of the fixing belt 20. In addition, a temperature drop at the end portion can be detected by the end-side thermistor 25A. Therefore, it is possible to prevent the rotator from being damaged due to an increase in the temperature of the end portion at low cost and to suppress a temperature drop in the end portion of the rotator.

The sheets P serving as recording media may be thick paper, postcards, envelopes, plain paper, thin paper, coated paper, art paper, tracing paper, overhead projector (OHP) transparencies, plastic film, prepreg, copper foil, and the like.

The terms detection and sensing in the present application are synonyms.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A conveyance device configured to convey a recording medium, the conveyance device comprising:

a heater configured to heat the recording medium, the heater having a maximum passage region corresponding to a maximum width of the recording medium;

a first temperature detector and a second temperature detector configured to detect a temperature of the heater; and a recording medium detector configured to detect the recording medium, wherein the first temperature detector is disposed at a position farther from a center position of a heating region of the heater than the second temperature detector in a conveyance orthogonal direction, the conveyance orthogonal direction being along a surface of the recording medium and orthogonal to a direction in which the recording medium is conveyed, the position of the first temperature detector offset from a closest edge of the maximum passage region towards the center positon of the heating region of the heater, and wherein the recording medium detector is disposed on a side opposite to the first temperature detector with respect to the second temperature detector in the conveyance orthogonal direction.

2. The conveyance device according to claim 1, wherein a relation of L1<L2 is satisfied, where L1 is a distance in the conveyance orthogonal direction from the center position of the heating region of the heater to the first temperature detector, and L2 is a distance in the conveyance orthogonal direction from the center position of the heating region of the heater in the conveyance orthogonal direction to the recording medium detector.

3. The conveyance device according to claim 2, wherein the first temperature detector is a thermistor having a temperature detecting element, and L1 is a distance in the conveyance orthogonal direction from the center position of the heating region of the heater to the temperature detecting element of the first temperature detector.

4. The conveyance device according to claim 1, wherein the recording medium detector is disposed upstream from the heater on a conveyance path of the recording medium.

5. The conveyance device according to claim 4, further comprising a recording medium feeder configured to load the recording medium and supply the recording medium to the conveyance path, wherein the recording medium detector is disposed in the recording medium feeder.

6. The conveyance device according to claim 1, wherein where a passage region in the conveyance orthogonal direction of a recording medium having a maximum length in the conveyance orthogonal direction among recording media compatible with the conveyance device is a maximum passage region, the recording medium detector is disposed inside the maximum passage region and outside a passage region in the conveyance orthogonal direction of a recording medium having a second maximum length in the conveyance orthogonal direction among the recording media compatible with the conveyance device.

7. The conveyance device according to claim 6, wherein a recording medium detection region of the recording medium detector is in a range of 1 mm or more and 5 mm or less in a width direction from an end of the maximum passage region.

8. An image forming apparatus comprising the conveyance device according to claim 1.

9. The image forming apparatus according to claim 8, further comprising a heating device including:

a rotator to be heated by the heater;

the first temperature detector; and the second temperature detector, wherein the rotator includes no elastic layer.

10. The conveyance device according to claim 1, wherein the position of the first temperature detector on the heater has a heat transfer profile the same as a heat transfer profile of a position of the second temperature detector on the heater based on a recording medium passing through the conveyance device.

* * * * *